US011491490B1

(12) United States Patent
Black et al.

(10) Patent No.: US 11,491,490 B1
(45) Date of Patent: Nov. 8, 2022

(54) ORGANIC WASTE MANAGEMENT SYSTEM

(71) Applicant: BioGreen 360, Inc., Portsmouth, NH (US)

(72) Inventors: Ian J. Black, Portsmouth, NH (US); Thomas A. Brown, Rye, NH (US); Justin C. J. Rosberg, Sr., Tewksbury, MA (US); Paul R. Salibe, Jr., Tewksbury, MA (US); Zachary C. Doyon, Eliot, ME (US); Ralph E. Faia, Jr., Everett, MA (US); Ralph E. Faia, III, Everett, MA (US); Marc Faia, Everett, MA (US)

(73) Assignee: BioGreen 360, Inc., Portsmouth, NH (US)

( * ) Notice: Subject to any disclaimer, the term of this patent is extended or adjusted under 35 U.S.C. 154(b) by 0 days.

(21) Appl. No.: 17/667,166

(22) Filed: Feb. 8, 2022

Related U.S. Application Data

(60) Provisional application No. 63/232,884, filed on Aug. 13, 2021, provisional application No. 63/194,007, filed on May 27, 2021.

(51) Int. Cl.
*B02C 23/10* (2006.01)
*B02C 17/16* (2006.01)
(Continued)

(52) U.S. Cl.
CPC ............ *B02C 17/163* (2013.01); *B02C 23/10* (2013.01); *B09B 3/35* (2022.01); *B02C 21/02* (2013.01);
(Continued)

(58) Field of Classification Search
CPC ....... B02C 18/06; B02C 17/163; B02C 19/22; B02C 13/14; B02C 2013/145; B02C 23/10; B02C 23/16; B02C 25/00; B09B 3/35
See application file for complete search history.

(56) References Cited

U.S. PATENT DOCUMENTS 3,233,976 A 2/1966 Varro et al.
3,556,286 A 1/1971 Naito et al.
(Continued)

FOREIGN PATENT DOCUMENTS

CN 110239132 A 9/2019
GB 2462651 A 2/2010
(Continued)

OTHER PUBLICATIONS

International Searching Authority, International Search Report—International Application No. PCT/US2022/015646, dated Jun. 3, 2022 together with the Written Opinion of the International Searching Authority, 26 pages.

*Primary Examiner* — Faye Francis
(74) *Attorney, Agent, or Firm* — Nutter McClennen & Fish LLP

(57) ABSTRACT

A liquification system for an organic waste management system includes a hopper that is oriented vertically such that organic waste added to the hopper is biased by gravity toward a bottom end of the hopper; a fixed grinding plate disposed at the bottom end of the hopper and including grinding elements for grinding and liquefying organic waste; an agitator that is disposed within the hopper and is movable relative to the grinding plate in a first rotational direction that moves organic waste downward toward and against the grinding plate and in a second rotational direction that moves organic waste upward toward a top end of the hopper; a motor configured to selectively move the agitator in the first and second rotational directions under control of the controller; and an outlet through the bottom end of the hopper through which liquified organic waste drains from the hopper.

20 Claims, 40 Drawing Sheets

(51) Int. Cl.
*B09B 3/35* (2022.01)
*B09B 101/70* (2022.01)
*B02C 21/02* (2006.01)

(52) U.S. Cl.
CPC ....... *B02C 2201/06* (2013.01); *B09B 2101/70* (2022.01)

(56) References Cited

U.S. PATENT DOCUMENTS

| | | | |
|---|---|---|---|
| 3,590,202 A | 6/1971 | Day et al. | |
| 3,872,603 A | 3/1975 | Williams et al. | |
| 4,026,528 A * | 5/1977 | Kline | A01K 5/004 |
| | | | 241/101.8 |
| 4,035,598 A | 7/1977 | Van Amsterdam | |
| 5,337,964 A | 8/1994 | Buehlmann | |
| 5,353,998 A | 10/1994 | Sansing | |
| 5,393,961 A | 2/1995 | Umekage et al. | |
| 5,429,436 A * | 7/1995 | Stone | A01F 29/005 |
| | | | 366/186 |
| 5,496,730 A | 3/1996 | Teramachi | |
| 5,601,362 A * | 2/1997 | Schuler | B01F 27/92 |
| | | | 366/323 |
| 5,615,839 A * | 4/1997 | Hartwig | A23N 17/02 |
| | | | 241/260.1 |
| 5,731,199 A * | 3/1998 | Roggero | C12M 45/02 |
| | | | 241/82.5 |
| 5,980,823 A | 11/1999 | Nekozuka et al. | |
| 6,139,744 A | 10/2000 | Spears et al. | |
| 6,224,646 B1 | 5/2001 | Arato et al. | |
| 6,470,597 B1 | 10/2002 | Stipp | |
| 6,863,433 B2 * | 3/2005 | Knight | B01F 33/833 |
| | | | 366/314 |
| 6,863,826 B2 | 3/2005 | Sheets | |
| 6,983,902 B2 * | 1/2006 | Faccia | A01K 5/004 |
| | | | 241/101.8 |
| 9,603,203 B2 | 3/2017 | Wilber et al. | |
| 10,563,165 B2 | 2/2020 | Grillo et al. | |
| 2002/0030012 A1 | 3/2002 | Sullivan et al. | |
| 2003/0034232 A1 | 2/2003 | Kaeb et al. | |
| 2005/0092741 A1 | 5/2005 | Eves et al. | |
| 2006/0000108 A1 | 1/2006 | Cho et al. | |
| 2006/0049185 A1 | 3/2006 | Masson et al. | |
| 2009/0218196 A1 | 9/2009 | Gronvall et al. | |
| 2009/0296517 A1 * | 12/2009 | Tamminga | A01K 5/004 |
| | | | 366/314 |
| 2010/0058821 A1 | 3/2010 | Romano et al. | |
| 2011/0179841 A1 | 7/2011 | Lu | |
| 2012/0020844 A1 | 1/2012 | Foret | |
| 2013/0089918 A1 | 4/2013 | Atkinson | |
| 2013/0205649 A1 | 8/2013 | Larsen et al. | |
| 2013/0284841 A1 * | 10/2013 | Pellman | B01F 27/9212 |
| | | | 241/246 |
| 2019/0118187 A1 * | 4/2019 | Nahtigal | B02C 18/18 |

FOREIGN PATENT DOCUMENTS

JP  H-10165928 A  6/1998
WO  2012/009462 A2  1/2012

* cited by examiner

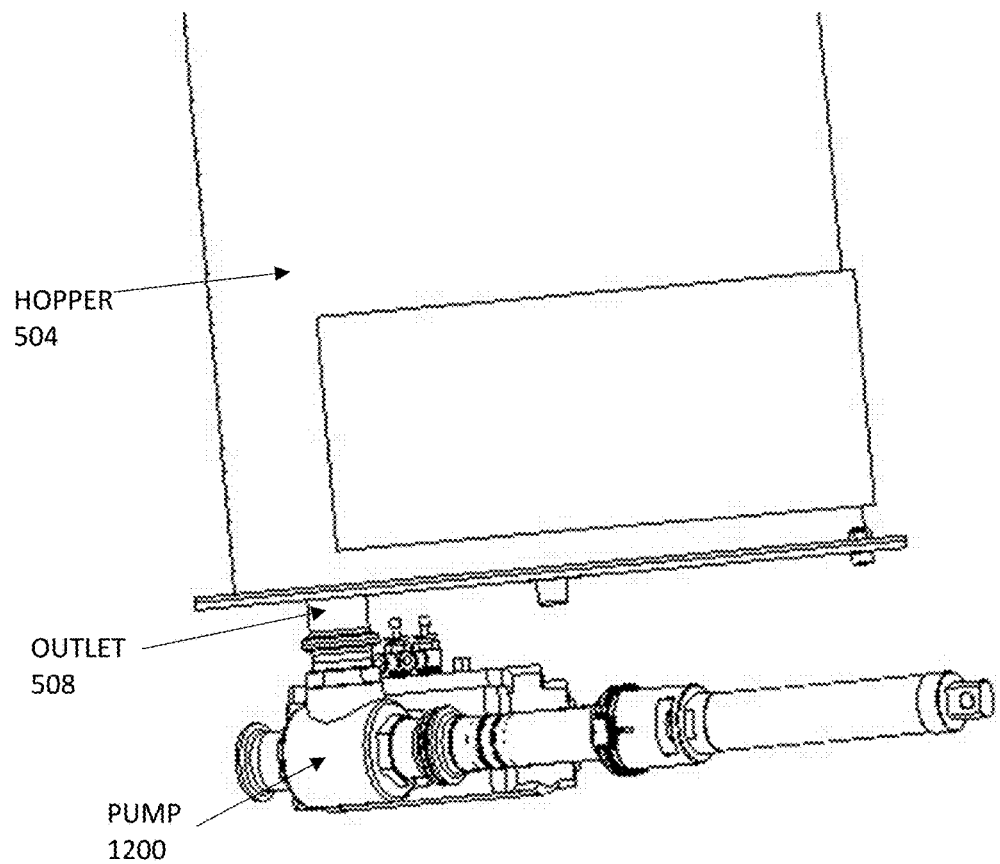
FIG. 12
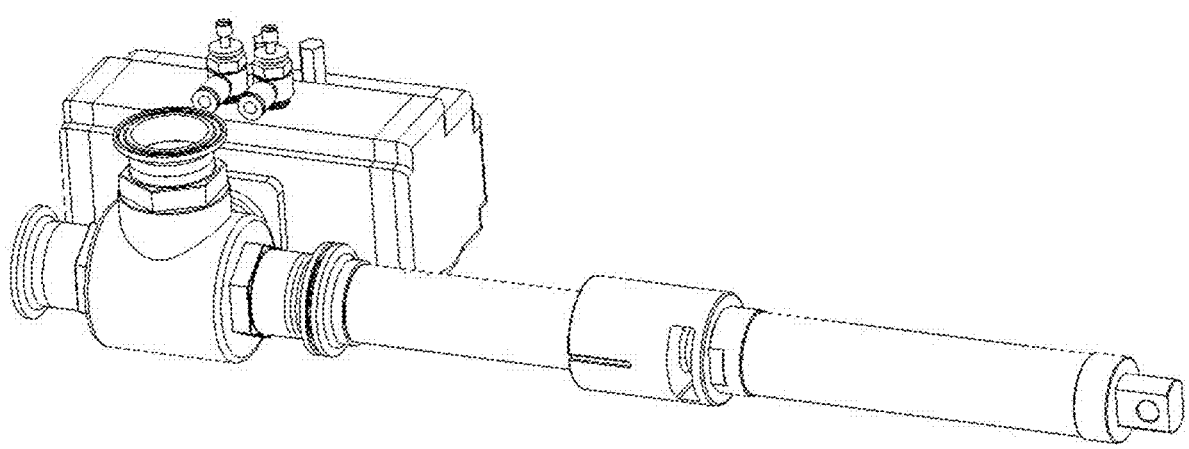
FIG. 13    1200

ORGANIC WASTE MANAGEMENT SYSTEM

CROSS-REFERENCE TO RELATED APPLICATION(S)

This patent application claims the benefit of U.S. Provisional Patent Application No. 63/232,884 entitled ORGANIC WASTE MANAGEMENT SYSTEM filed Aug. 13, 2021 and U.S. Provisional Patent Application No. 63/194,007 entitled ORGANIC WASTE MANAGEMENT SYSTEM filed May 27, 2021, each of which is hereby incorporated herein by reference in its entirety.

The subject matter of this patent application may be related to the subject matter of U.S. patent application Ser. No. 15/501,595 entitled Organic Waste Digester System filed Feb. 3, 2017 (now U.S. Pat. No. 10,563,165), which is a 371 of PCT Application No. PCT/US15/33212 filed May 29, 2015, which claims priority from U.S. Provisional Patent Application No. 62/033,437 filed Aug. 5, 2014, each of which is hereby incorporated herein by reference in its entirety.

FIELD OF THE INVENTION

The invention generally relates to organic waste management systems.

BACKGROUND OF THE INVENTION

Food loss and waste is a growing problem in our modern society. The amount of food Americans throws away each year is staggering. In 2014 alone, more than 38 million tons of food waste was generated, with only five percent diverted from landfills and incinerators. EPA estimates that more food reaches landfills and incinerators than any other single material in our everyday trash, constituting an estimated 21.6 percent of discarded municipal solid waste, making it the single largest source of landfill waste by weight and an estimated 21% of landfill volume.

Food loss and waste has an enormous environmental impact. For example, rotting food creates methane gas, which is 25× more potent as a greenhouse gas (GHG) than carbon dioxide. Furthermore, it is estimated that 300 million barrels of oil are wasted on food that is tossed away, 21% of fresh water is used to produce food that is then discarded, 40% of all food produced in the USA is wasted, 52.4 million tons are sent to landfills, and 16% of methane emissions come from landfills.

Government initiatives at State and Local levels outlawing food waste from commercial sources in landfills is intensifying across the United States. There are growing efforts both to prevent wasted food from occurring in the first place and to divert if from landfills and incinerators in all 10 EPA regions.

SUMMARY OF VARIOUS EMBODIMENTS

In accordance with one embodiment, a liquidization system for an organic waste management system includes a hopper that receives organic waste through an inlet at a top end of the hopper, the hopper being oriented vertically such that organic waste added to the hopper is biased by gravity toward a bottom end of the hopper; a fixed grinding plate disposed at the bottom end of the hopper and including grinding elements for grinding and liquefying organic waste; an agitator that is disposed within the hopper and is movable relative to the grinding plate in a first rotational direction that moves organic waste downward toward and against the grinding plate and in a second rotational direction that moves organic waste upward toward a top end of the hopper; a motor configured to selectively move the agitator in the first and second rotational directions; and an outlet through the bottom end of the hopper through which liquified organic waste drains from the hopper.

In accordance with another embodiment, an organic waste management system includes a controller and a liquidization system comprising a hopper that receives organic waste through an inlet at a top end of the hopper, the hopper being oriented vertically such that organic waste added to the hopper is biased by gravity toward a bottom end of the hopper; a fixed grinding plate disposed at the bottom end of the hopper and including grinding elements for grinding and liquefying organic waste; an agitator that is disposed within the hopper and is movable relative to the grinding plate in a first rotational direction that moves organic waste downward toward and against the grinding plate and in a second rotational direction that moves organic waste upward toward a top end of the hopper; a motor configured to selectively move the agitator in the first and second rotational directions under control of the controller; and an outlet through the bottom end of the hopper through which liquified organic waste drains from the hopper.

In various alternative embodiments, the hopper may be vertically oriented but offset from a vertical axis such that the grinding plate is offset from a horizontal axis and the grinding plate includes drainage holes on a lower side of the grinding plate to assist with drainage of the liquified organic waste. The drainage holes may be sized to prevent drainage of non-liquified organic waste. The agitator may include a shaft having a bottom impeller configured to force organic waste against the grinding plate to grind the organic waste when the agitator is moved in the first rotational direction. The agitator additionally may include a screw auger to assist with movement of the organic waste within the hopper. The motor may be outside of the hopper in order to avoid contamination of the motor and associated bearings and seals from organic waste within the hopper. The bottom end of the hopper may include a tapered portion narrowing toward the grinding plate, and at least one grinding element may be disposed on the tapered portion such that movements of the agitator drive organic waste against the at least one grinding element. The system may include a weight sensor for sensing weight of the contents of the hopper. The system may include an electronically-lockable hopper door for selectively blocking the inlet at the top end of the hopper.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 12 is a schematic diagram showing a pump (e.g., a hose pump or other appropriate pump type) attached directly to the outlet of the liquification system, in accordance with certain exemplary embodiments.

FIG. 13 is a schematic diagram showing a detailed perspective view of the pump of FIG. 12.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Introduction

Exemplary embodiments include various organic waste management systems and processes that can recycle organic waste such as, for example, food waste (e.g., raw and cooked fish, meat and poultry, small bones, eggs and egg shells, fruits, vegetables, dairy products, and grain products), farm waste, and other organic waste. In a first stage, the organic waste is degraded and liquefied. This liquification process can be augmented or accelerated, for example, by the addition of microbes and/or or other additives and/or heat. In a second stage, the liquefied waste is dehydrated. The system optionally includes a third stage in which the dehydrated waste is dried. Among other things, and without limitation, such organic waste management systems can be used to produce compost or compostable material, to produce fertilizer material, to produce animal feed material, to produce a fuel material (e.g., capable of being combusted), to reduce the mass or volume of landfill material, to improve the safety of disposable material (e.g., by killing microbes), and/or to recover or recycle water or other material (e.g., oil/grease).

High-Level Block Diagram and Description

Figure 1:
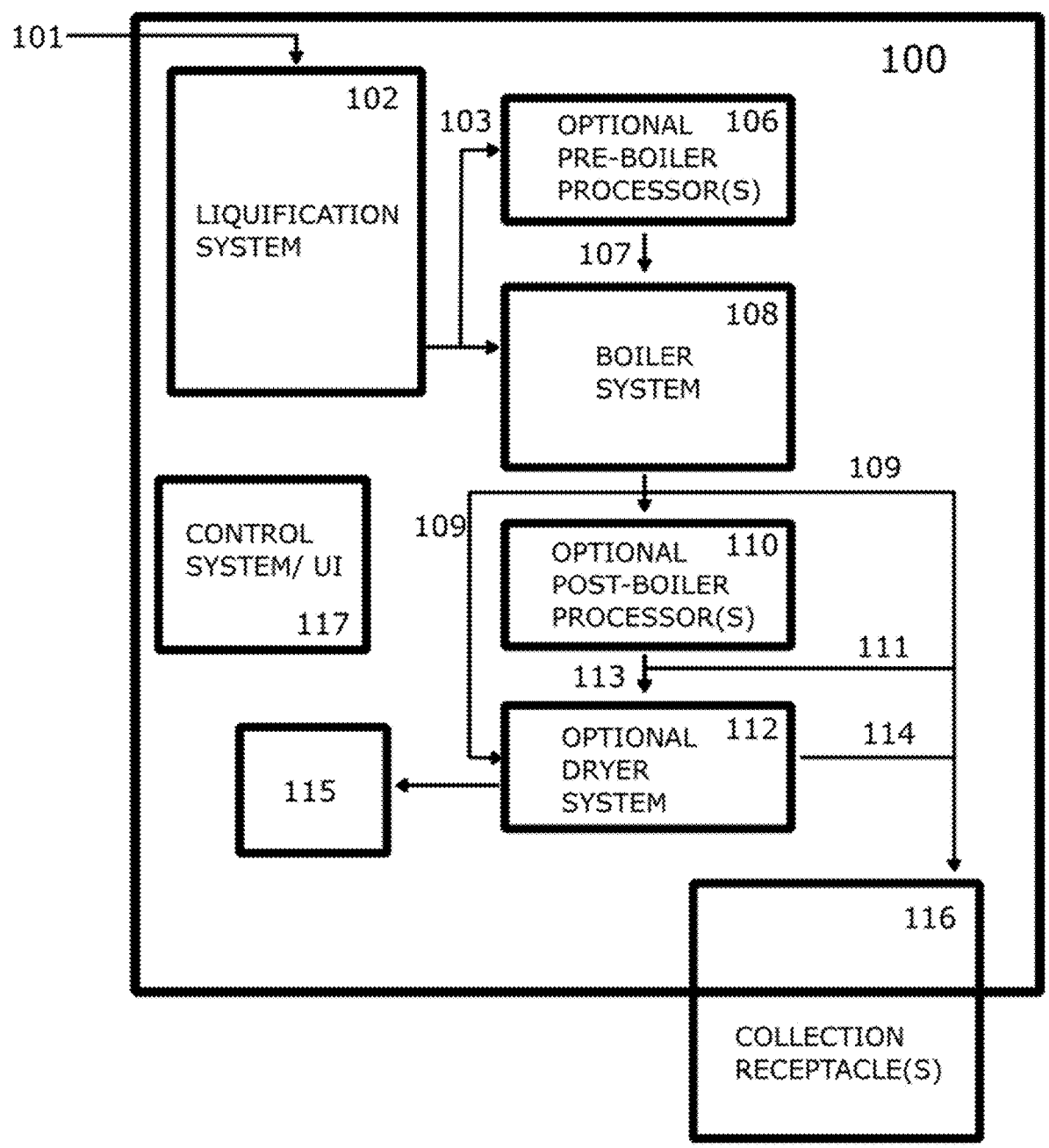
FIG. 1 is a schematic diagram showing relevant components of an organic waste management system in accordance with certain exemplary embodiments.

FIG. 1 is a schematic diagram showing relevant components of an organic waste management system 100 in accordance with certain exemplary embodiments. Among other things, the organic waste management system 100 includes a liquification system 102 that liquifies organic waste 101 to produce a liquefied organic waste product 103. Organic waste content added to the liquification system 102 can be tracked, for example and without limitation, via manual input of content information by a user, using "smart" collection containers that can identify and convey content information to the system, using known information about a particular system location (e.g., produce department, meat department, seafood department, etc.), using identity of the individual who is loading the content (e.g., person X might be known to work in the produce department and therefore the system could infer that the content is produce), using camera recognition, or other mechanism. Among other things, the liquefied organic waste product 103 may be collected in one or more collection receptacles 116 internal and/or external to the system, provided to a boiler system 108 (which also may be referred to as dehydration system 108), or provided to one or more optional pre-boiler processors 106 (e.g., to remove water and/or oil from the liquefied organic waste product 103 prior to boiling/condensing of the resulting liquefied organic waste product 107). The boiler system 108 uses heat to reduce moisture content of the liquefied organic waste product 103/107 to produce a condensed organic waste product 109. The heat of the boiler system 108 is preferably sufficient to kill some or all pathogens in the liquefied organic waste product 103/107.

Among other things, the condensed organic waste product 109 may be collected in one or more receptacles 116 internal and/or external to the system, provided to an optional dryer system 112, or provided to one or more optional post-boiler processors 110 (e.g., to remove water and/or oil from the condensed organic waste product 109 prior to collection or drying of the resulting condensed organic waste product 111). Excess heat from the boiler system 108 may be recovered, e.g., for use in other parts of the system (e.g., to provide heat to the liquification system 102 or optional dryer system 114) or for other uses. Water may be recovered from steam produced during the boiling process, e.g., for use in other parts of the system (e.g., for optionally adding water to the liquification system 102) or for other uses.

The optional dryer system 112 can use any of a variety of drying techniques to dry the condensed organic waste product 109/111 to produce a dried organic waste product 114, which can be collected in one or more receptacles 116 internal and/or external to the system. Exemplary embodiments are described below with reference to a dryer system 112 that uses microwaves to dry the condensed organic waste product 109/111. One or more post-dryer processors 115 can be included, e.g., to filter and/or recover water from the dryer exhaust. A control system 117 (which may be referred to herein generically as a "controller") in communication with the various components controls the operation of waste management processes and the components of the system and provides a user interface and optional communication capabilities for the system (e.g., through the internet or other communication system). Each of these components will be discussed in detail below.

It should be noted that at any stage of the system, pumps can be provided to move materials from one stage to the next. For example, a pump may be used to move liquefied organic waste product 103 to the boiler system 108 or to one or more of the optional pre-boiler processors 106, and a pump may be used to move condensed organic waste product 109 to the optional dryer system 112, to one or more of the optional post-boiler processors 110, or to one or more of the collection receptacles 116.

Figure 2:
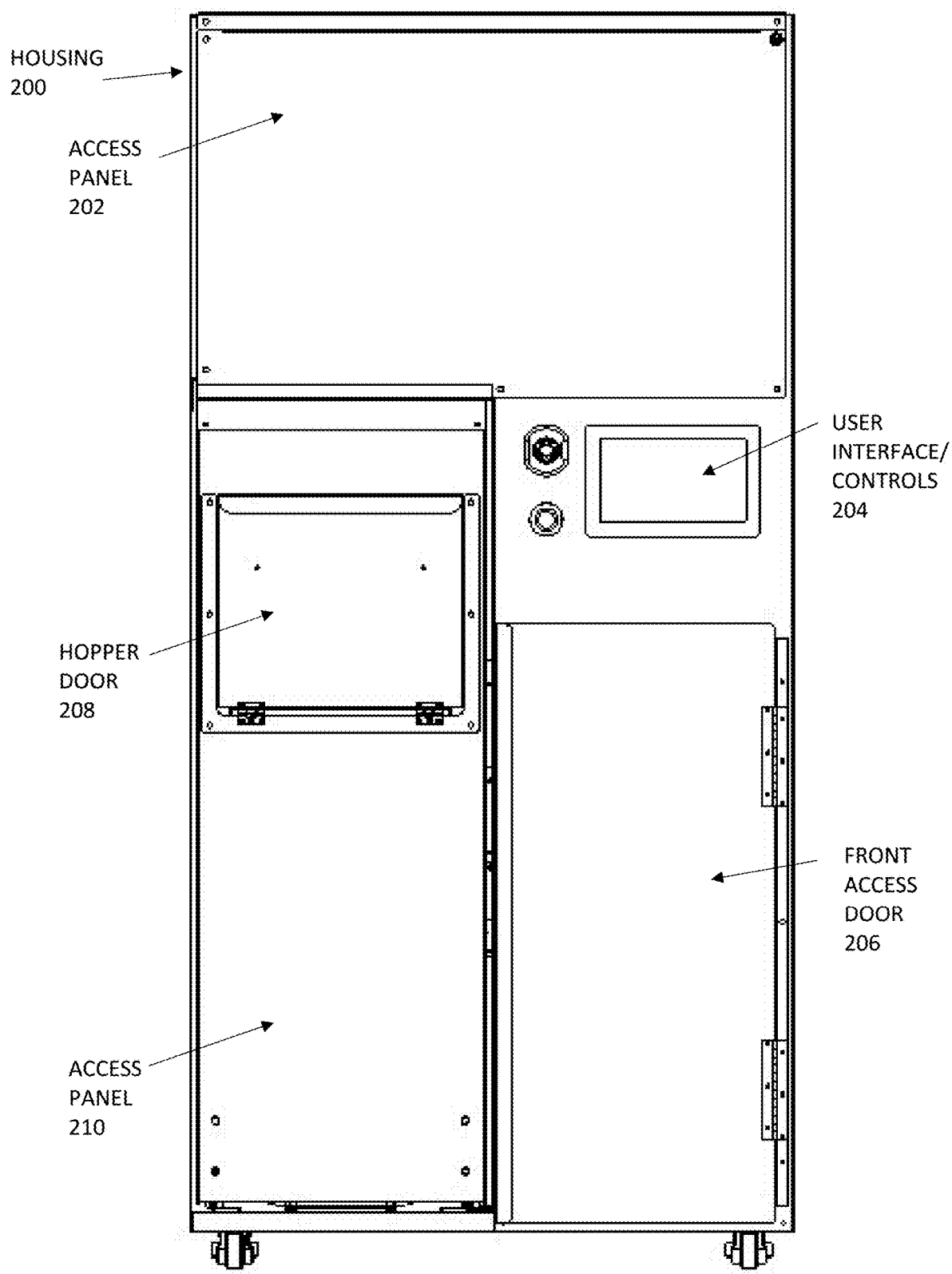
FIG. 2 is front view of a self-contained organic waste management system, in accordance with certain exemplary embodiments.
Figure 3:
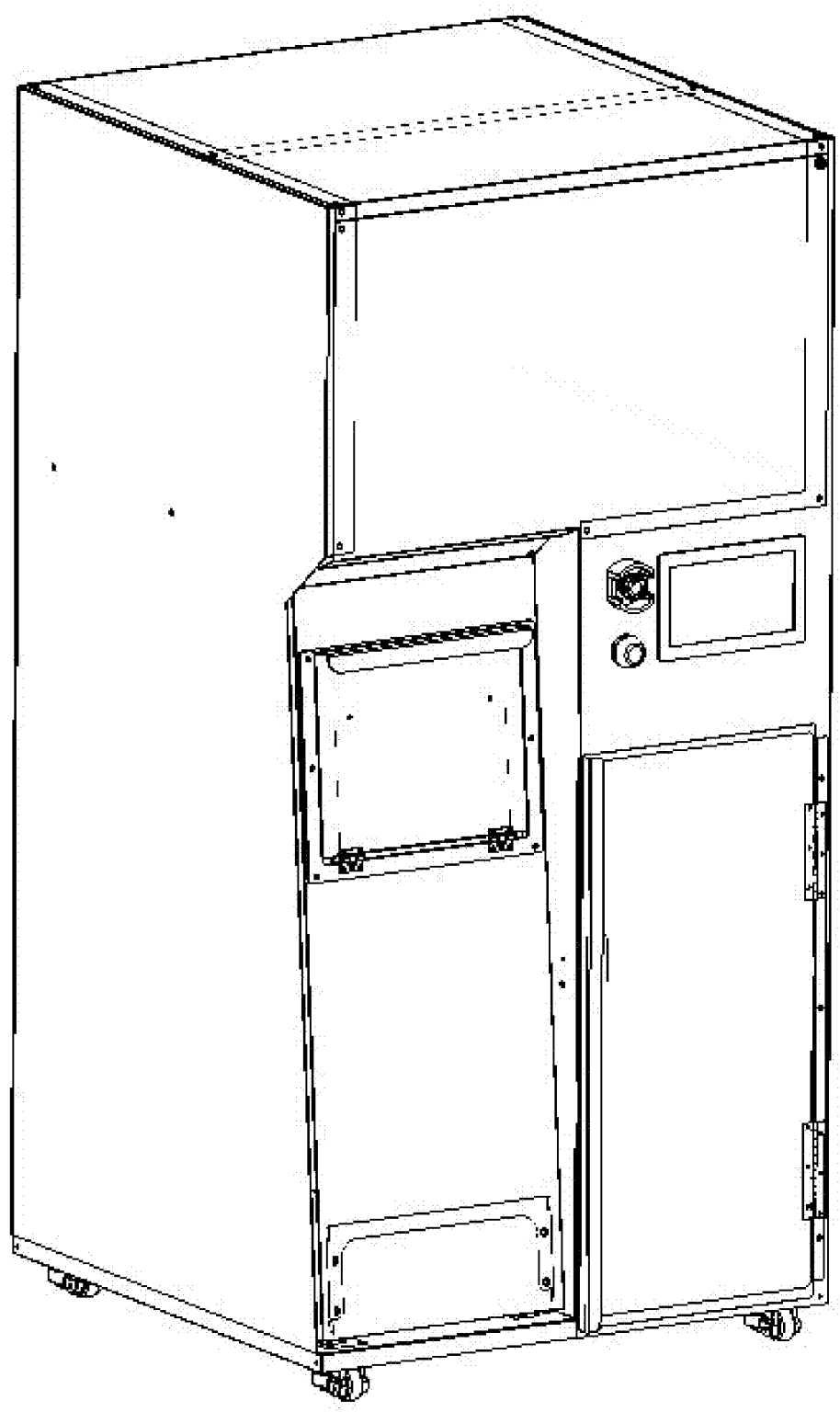
FIG. 3 is a left perspective view of the self-contained organic waste management system of FIG. 2.
Figure 4:
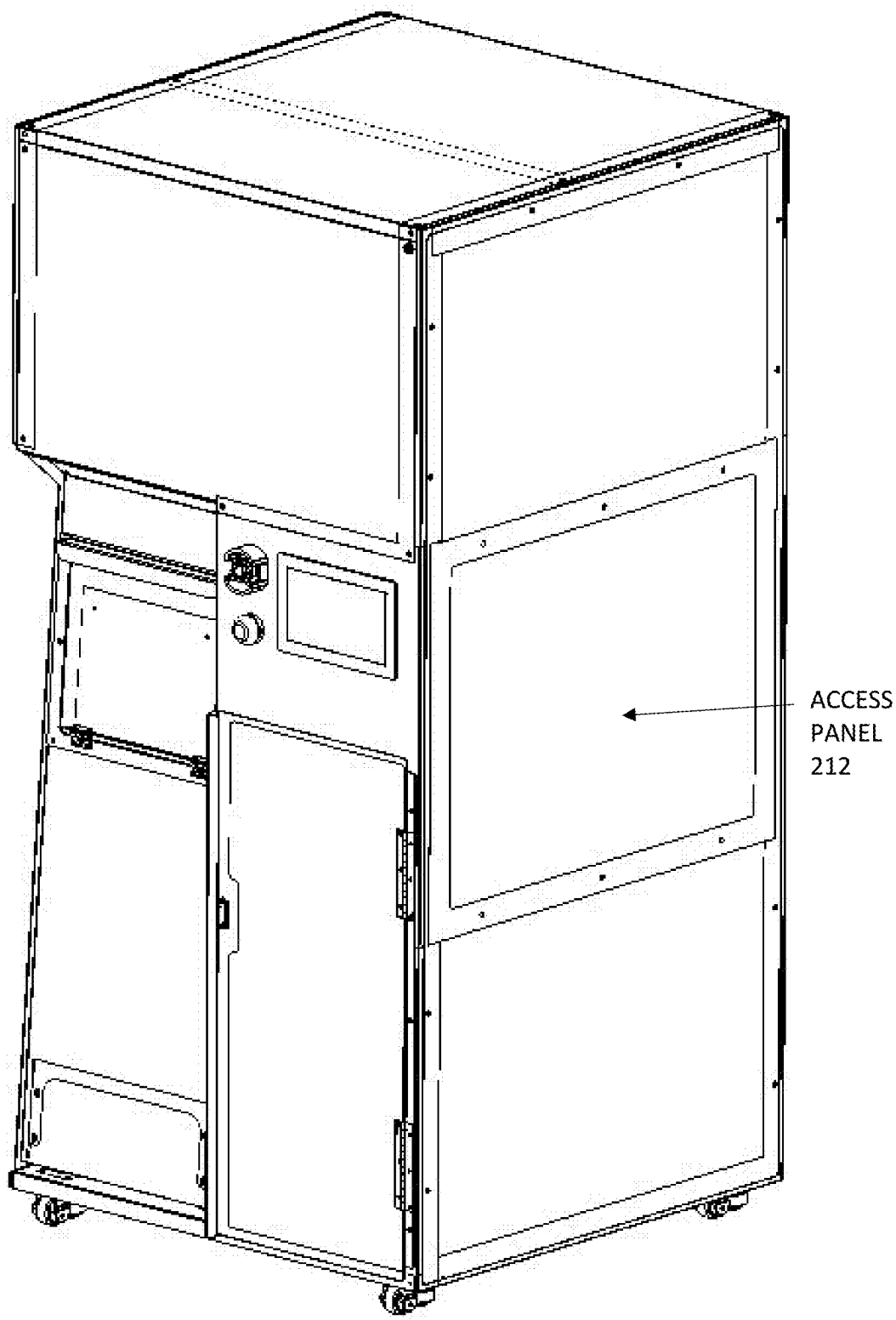
FIG. 4 is a right perspective view of the self-contained organic waste management system of FIG. 2.

Purely as a frame of reference, FIGS. 2, 3, and 4 are schematic diagrams showing the "form factor" for a self-contained organic waste management system 100, in accordance with certain exemplary embodiments. Specifically, FIG. 2 is front view of the housing 200 of the organic waste management system 100 showing relevant components including a hopper door 208 through which organic waste is fed into the system, a user interface and controls 204 through which the system is operated, and a front access door 206 and various access panels 202, 210 through which internal components can be accessed. FIG. 3 is a left perspective view showing the front, left side, and top of the housing of FIG. 1. FIG. 4 is a right perspective view showing the front, right side, and top of the housing of FIG. 1 including a side access panel 212.

Figure 29:
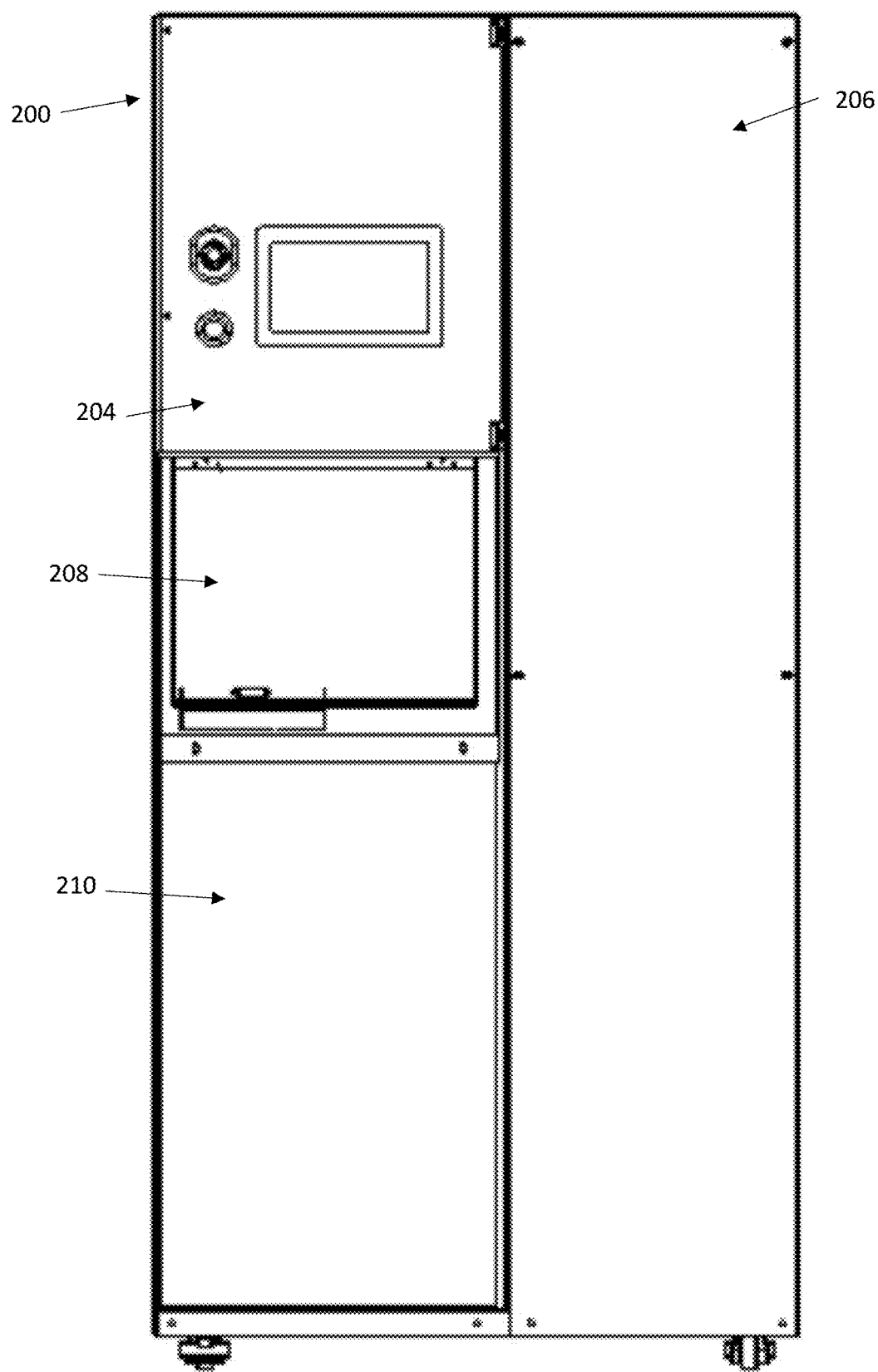
FIG. 29 is front view of the housing of an alternative organic waste management system.
Figure 30:
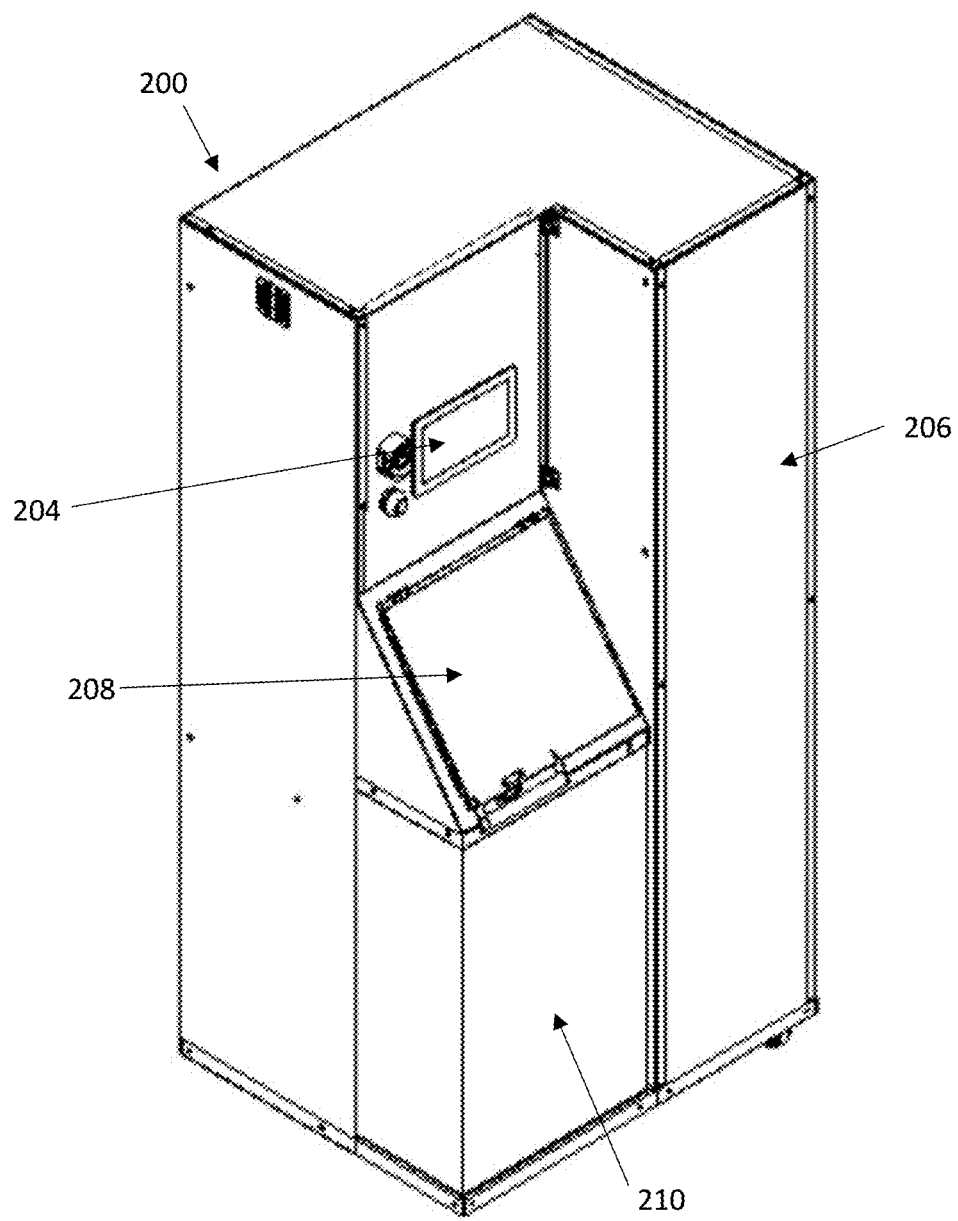
FIG. 30 is a left perspective view showing the front, left side, and top of the housing of FIG. 29.
Figure 31:
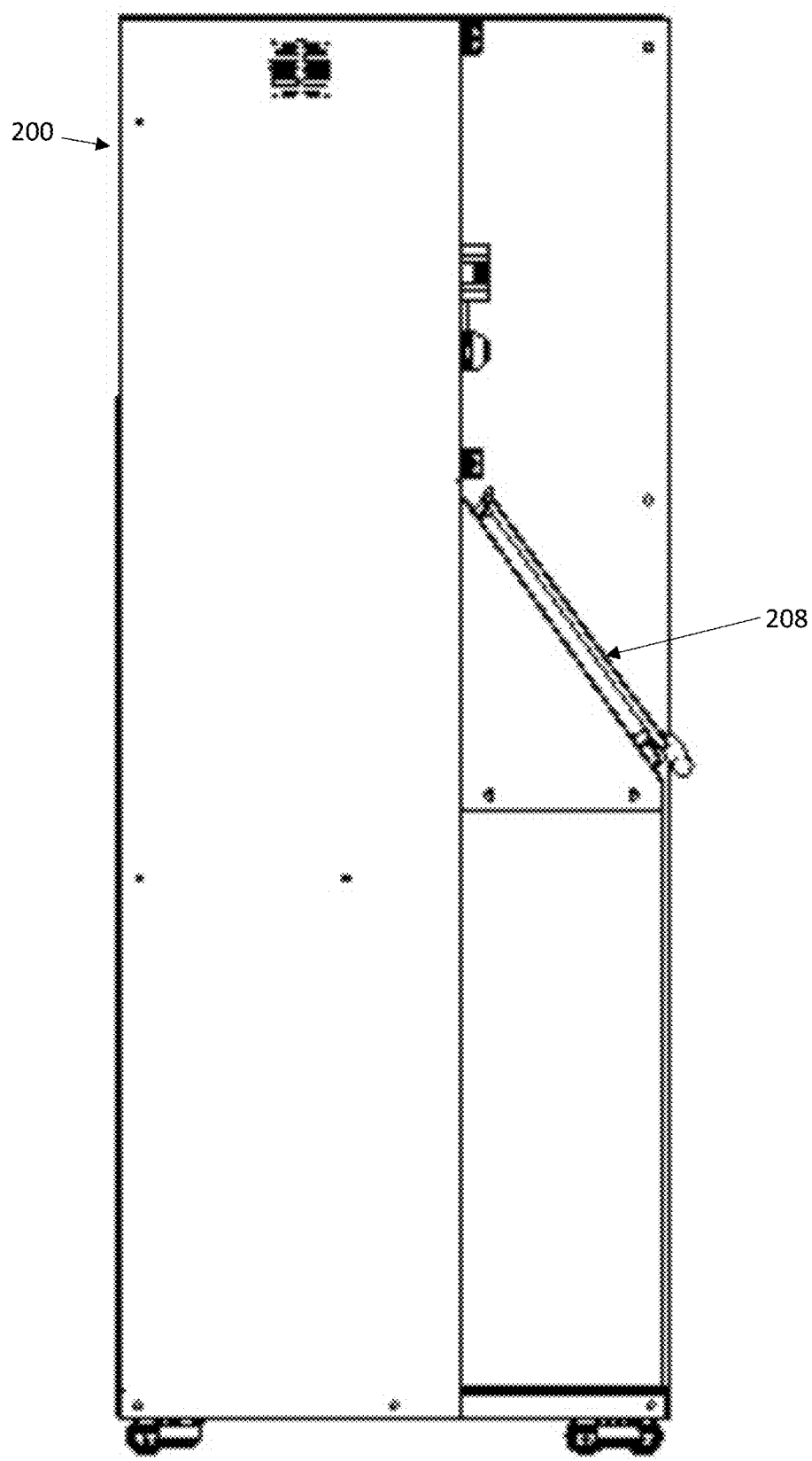
FIG. 31 is a left side view of the housing of FIG. 29.
Figure 32:
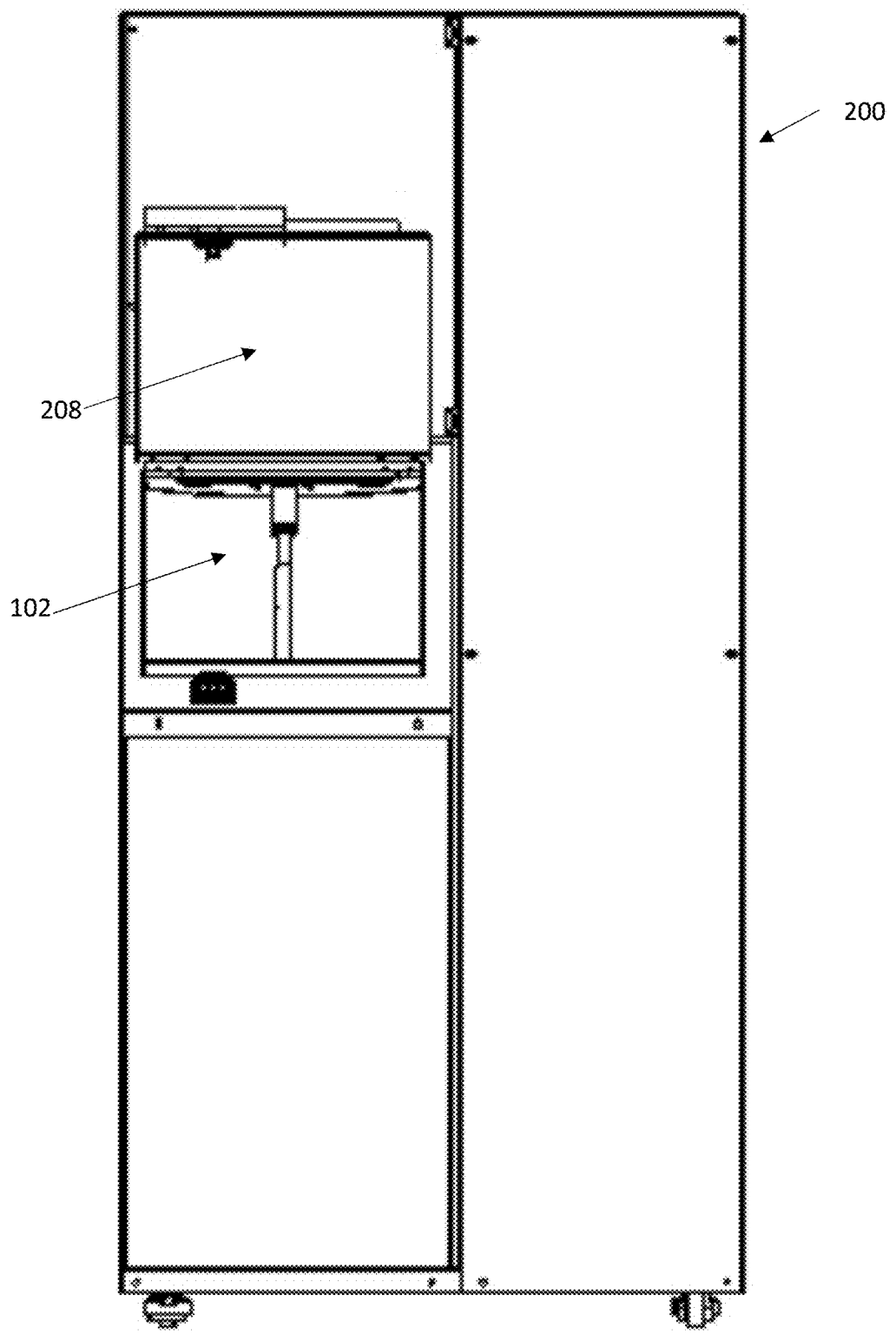
FIG. 32 is a front view of the housing of FIG. 29 with the hopper door open to expose a receptacle portion of the liquification system.
Figure 33:
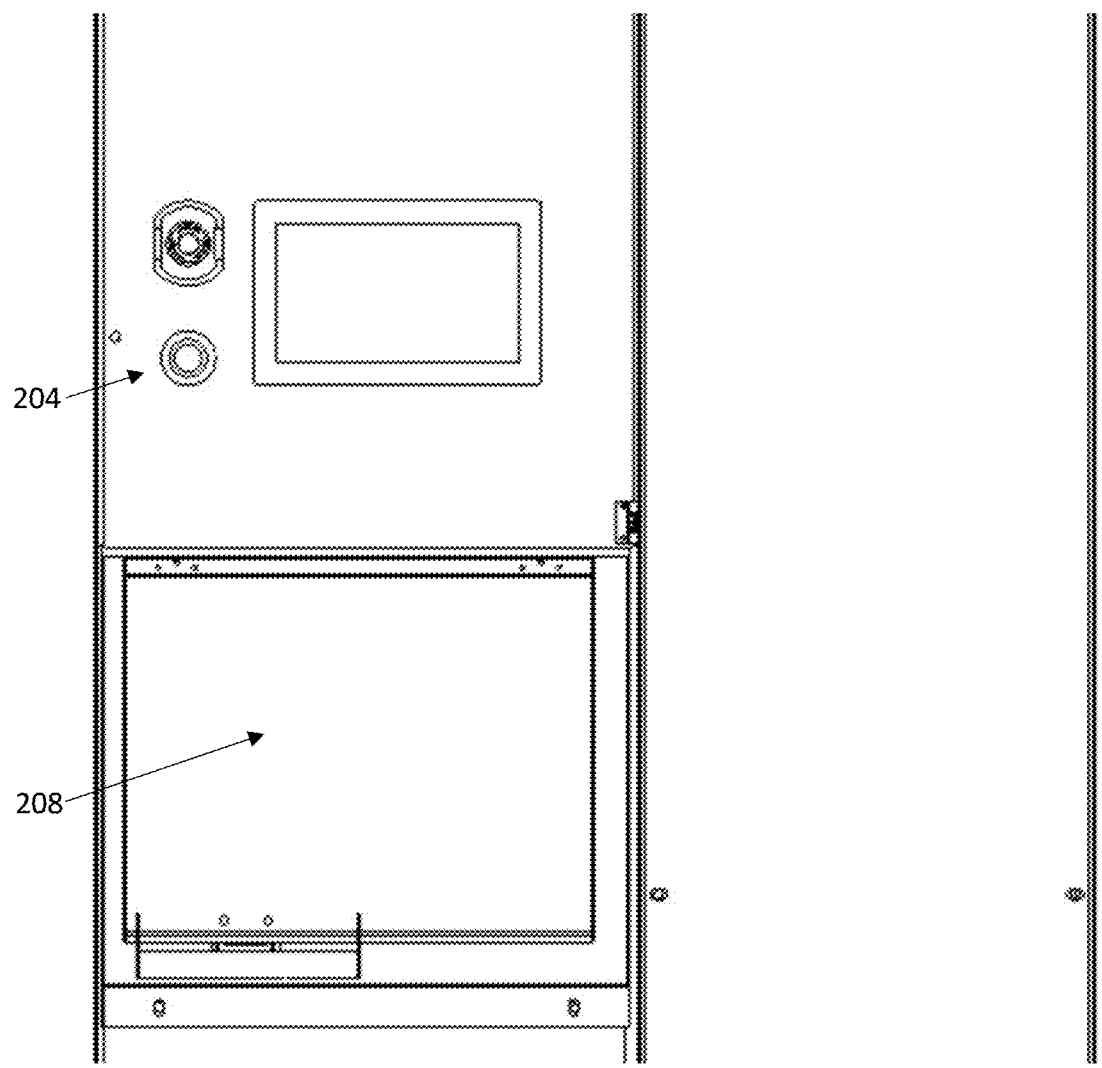
FIG. 33 is a close-up view of the hopper and user interface/controls of FIG. 29.

FIGS. 29-33 are schematic diagram showing the "form factor" for an alternative self-contained organic waste management system 100. Specifically, FIG. 29 is front view of the housing 200 of the alternative organic waste management system 100 showing relevant components including the hopper door 208, user interface and controls 204, a front access door 206, and access panel 210. FIG. 30 is a left perspective view showing the front, left side, and top of the housing 200 of FIG. 29. FIG. 31 is a left side view of the housing 200 of FIG. 29. FIG. 32 is a front view of the housing 200 of FIG. 29 with the hopper door 208 open to expose a receptacle portion of the liquification system 102. FIG. 33 is a close-up view of the hopper 208 and user interface/controls 204. It is important to note that embodiments of the present invention are not limited to or by the depicted housing or any particular size, shape, or configuration of housing (and alternative embodiments may omit a unitary housing and instead have separate interconnected components of the types described herein).

It is important to note that embodiments of the present invention are not limited to or by the depicted housings or any particular size, shape, or configuration of housing, and alternative embodiments may omit a unitary housing and instead have separate interconnected components of the types described herein. Thus, the various components of the system 100 can be considered to be modular components that can be used in various combinations in both integrated implementations (e.g., within a common housing) and distributed implementations (e.g., different components located at different places, with material moved from one component to the next components using pumps or other appropriate mechanisms, which could include transportation of materials from one location to another). For example and without limitation, one implementation might include just a liquification system 102 such as to produce liquefied organic waste product 103 for collection or other processing; another implementation might include a liquification system 102 and a boiler system 108 but no dryer system 112 such as to produce condensed organic waste product 109 for collection or other processing; another implementation might include all three of the liquification system 102, boiler system 108, and dryer system 112; another implementation might use include the liquification system 102 and the dryer system 112 but not the boiler system 108 (e.g., if the effluent from the liquification system 102 is suitable for drying without having to condense it); another implementation might use the boiler system 108 in combination with one or more other types of systems; another implementation might use the dryer system 112 in combination with one or more other types of systems; etc. Thus, the inventors consider each of the liquification system 102, the boiler system 108, and the dryer system 112 to be separate embodiments that also can be embodied in various combinations and/or with other components discussed herein (e.g., water separators, oil separators, water recycling, etc.).

Liquification System

Some exemplary liquification system embodiments are now described with reference to FIGS. 5-12 and 34-43.

Figure 5:
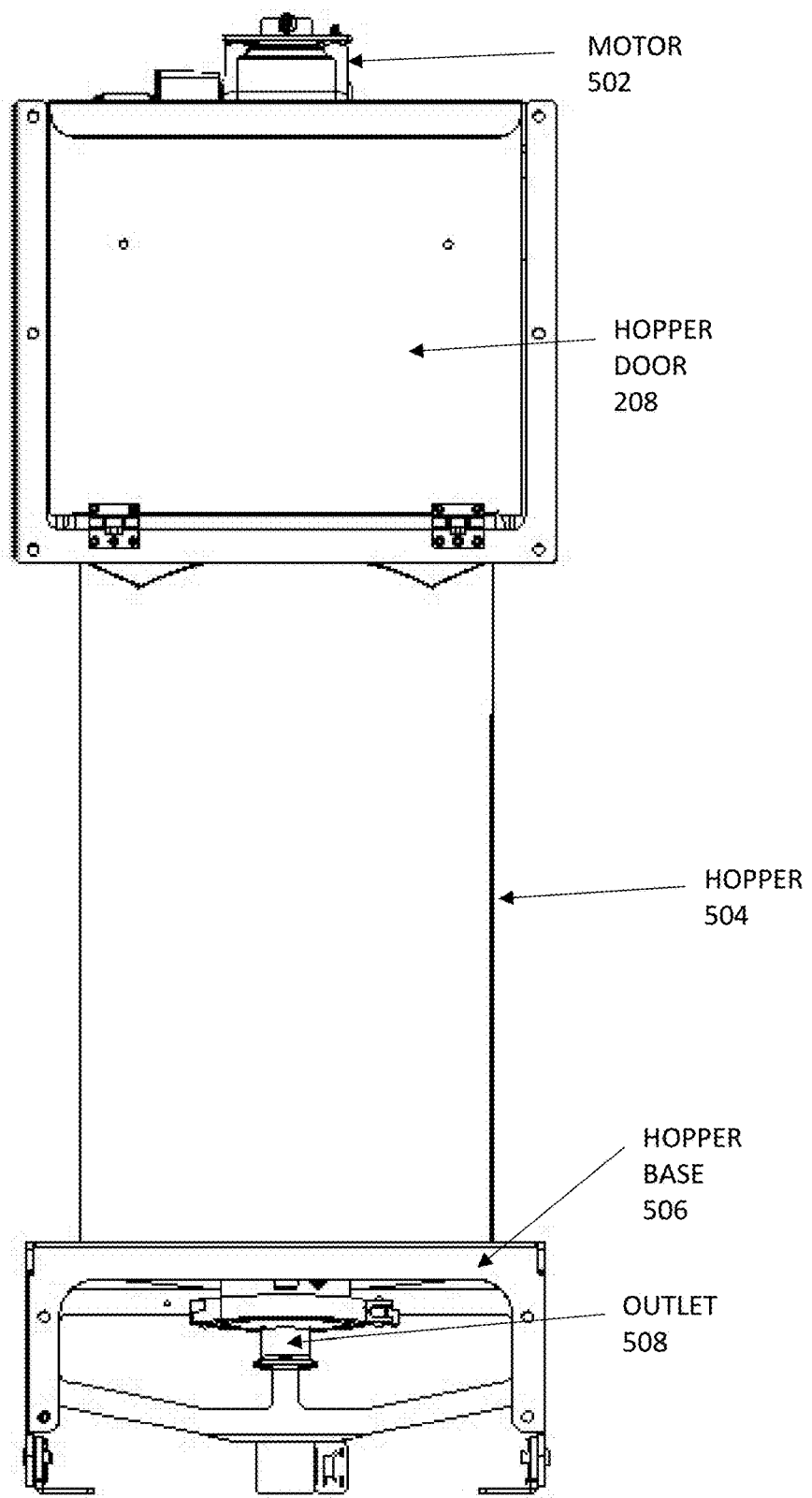
FIG. 5 is a schematic diagram showing a front view of the liquification system, in accordance with certain exemplary embodiments.
Figure 6:
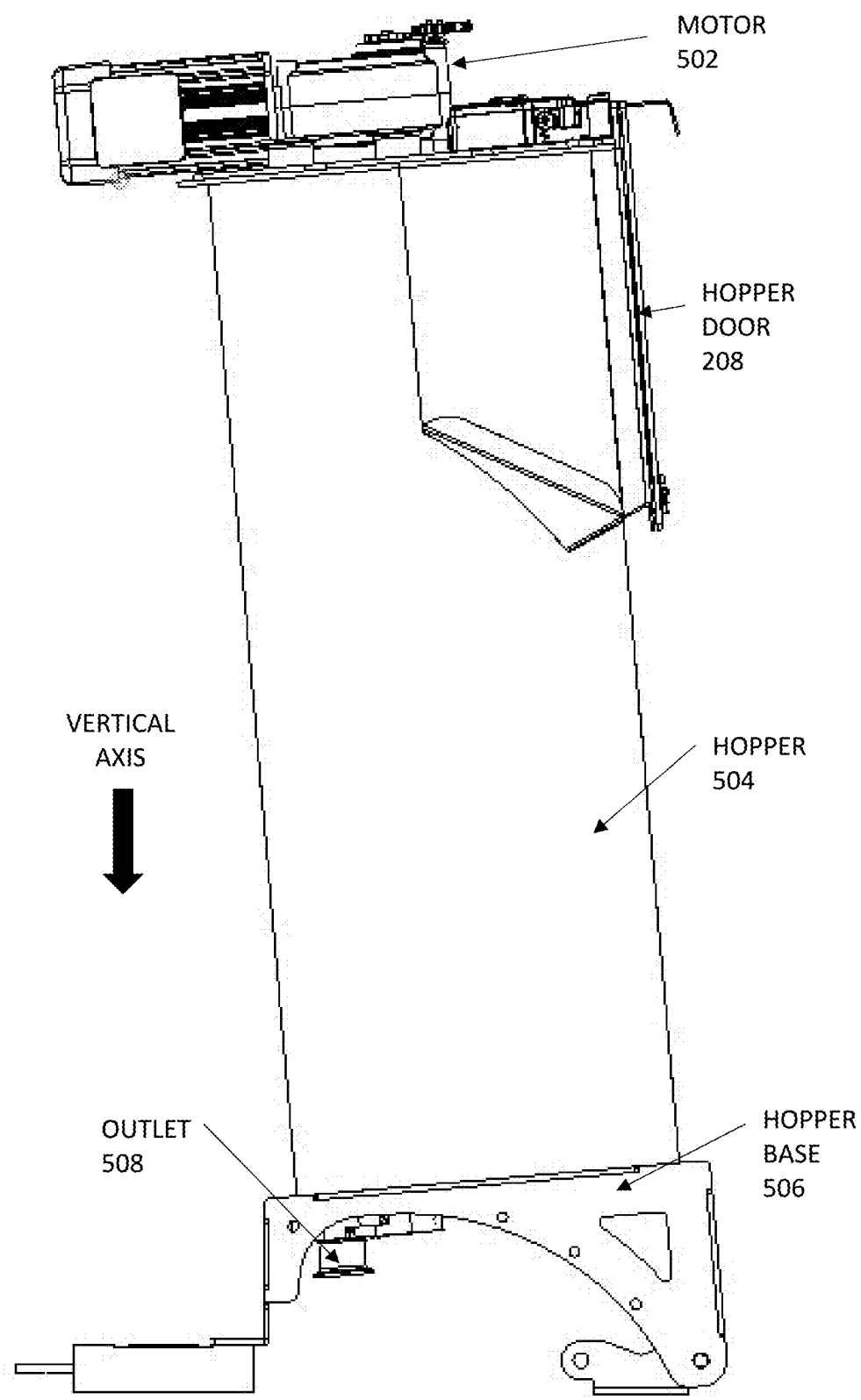
FIG. 6 is a left side view of the system of the liquification system of FIG. 5.
Figure 7:
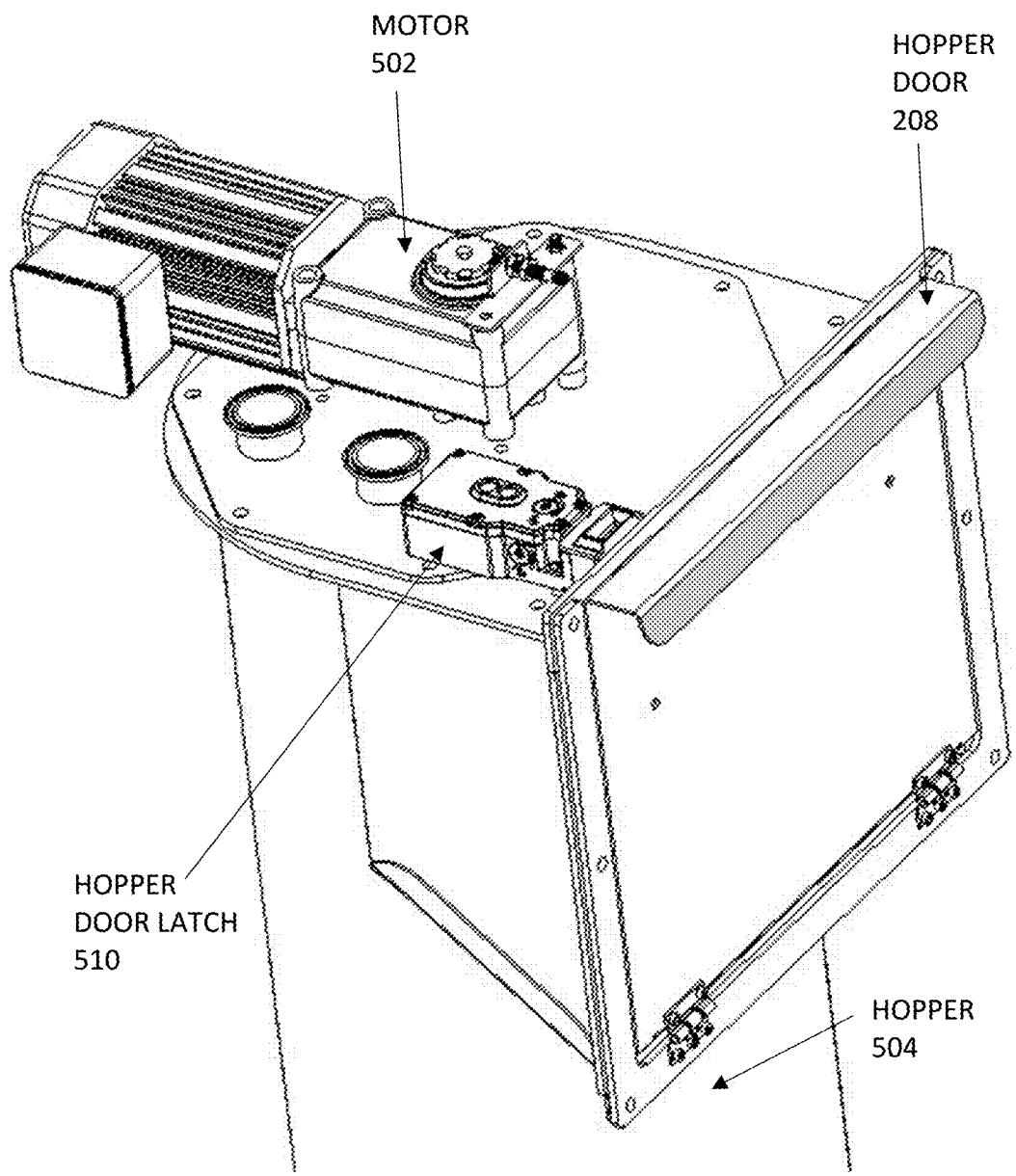
FIG. 7 is a left perspective view showing details of the top portion of the liquification system of FIG. 5.
Figure 8:
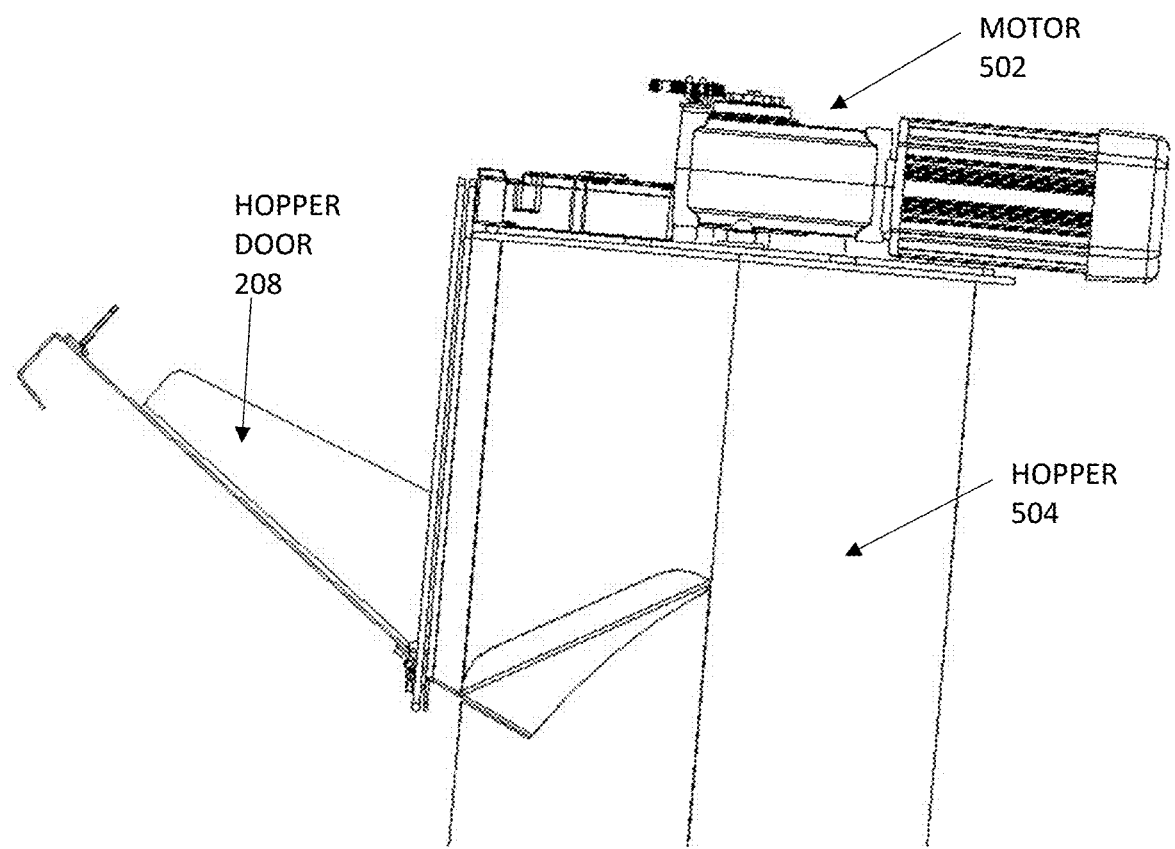
FIG. 8 is a right side view showing details of the top portion of the liquification system of FIG. 5.

FIG. 5 is a schematic diagram showing a front view of the liquification system 102, in accordance with certain exemplary embodiments. Among other things, the liquification system 102 includes a hopper 504 in communication with the hopper door 208 and supported by a hopper base 506, a motor 502 for operating various internal components (described below), and an outlet 508 through which liquified organic waste flows from the hopper. As described in greater detail below, the hopper 504 receives organic waste through an inlet at a top end of the hopper 514, and the hopper is oriented vertically such that organic waste added to the hopper 504 is biased by gravity toward a fixed grinding plate 518 at the bottom end of the hopper 504. FIG. 6 is a left side view of the system of the liquification system of FIG. 5 including the hopper 504 in communication with the hopper door 208 and supported by the hopper base 506, the motor 502, and the outlet 508. FIG. 7 is a left perspective view showing details of the top portion of the liquification system of FIG. 5 including the hopper door 208, the hopper 504, the motor 502, and a hopper door latch 510 that can be used to lock and unlock the hopper door 208 as well as sense whether the hopper door 208 is opened or closed. FIG. 8 is a right side view showing details of the top portion of the liquification system of FIG. 5 including the hopper door 208, the hopper 504, and the motor 502.

Figure 9:
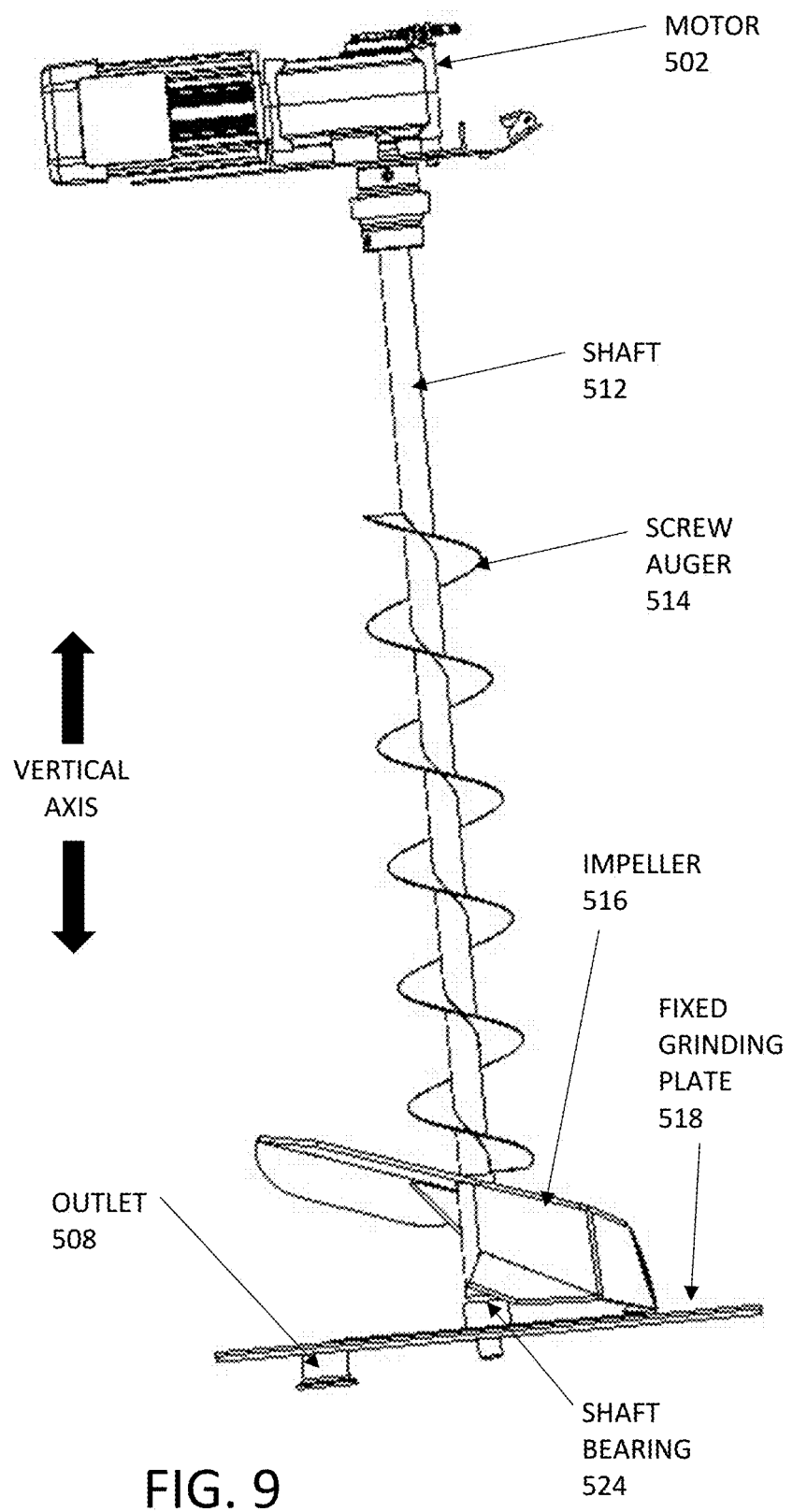
FIG. 9 is a schematic diagram showing a side view of relevant inner components of the liquification system, in accordance with certain exemplary embodiments.

FIG. 9 is a schematic diagram showing a side view of relevant inner components of the liquification system 102, in accordance with certain exemplary embodiments. Among other things, the liquification system 102 includes a shaft 512 that is rotated relative to a fixed grinding plate 518 by the motor 502. The shaft 512 includes a screw auger 514 to assist with movement and mixing of the contents within the hopper 504 (which can include having the motor rotate in one direction to push the contents downward where it can be ground and pumped to the next process step and/or having the motor rotate in the other direction to lift the contents upward so that food waste at the top can be covered or mixed with material that is rich in the curated biology of the tank) and a bottom impeller 516 that also assists with movement and mixing of the contents of the hopper 504 and also drives the contents against the fixed grinding plate 518 to grind and liquify the contents. For convenience, the shaft 512 with screw auger 514 and bottom impeller 516 is referred to herein as an "agitator." It should be noted that the agitator is not limited to having a screw auger 514 and/or a bottom impeller 516 but instead can include additional and/or alternative components to effectuate the same or similar operations performed by the agitator as described herein. The interaction between the bottom impeller 516 and the fixed grinding plate 518 uses force to wipe across the tank outlet holes 522 to effectively clear clogs and force material through the outlet 508 to be used in the subsequent process. The shaft 512 is rotatably coupled to the fixed grinding plate 518 by shaft bearing 524. As shown in FIGS. 39-42, the lower portion of the hopper 504 preferably includes a tapered (e.g., cone-shaped) portion 532 narrowing toward fixed grinding plate 518 at the bottom of the hopper 504 that, among other things, can reduce the force required to mix contents and reduce jamming of the components. Grinding elements can be included on the cone-shaped portion (e.g., a replaceable grinding element 526) to enhance grinding performance such as to allow for grinding through such things as bones, fibrous materials, fruit peels and skins, compostable cutlery, compostable packaging, pits, and other items that are traditionally hard to break down, which can create more surface area for biological interaction as well as break particles into smaller sizes, e.g., an acceptable size for fertilizer.

Figure 10:
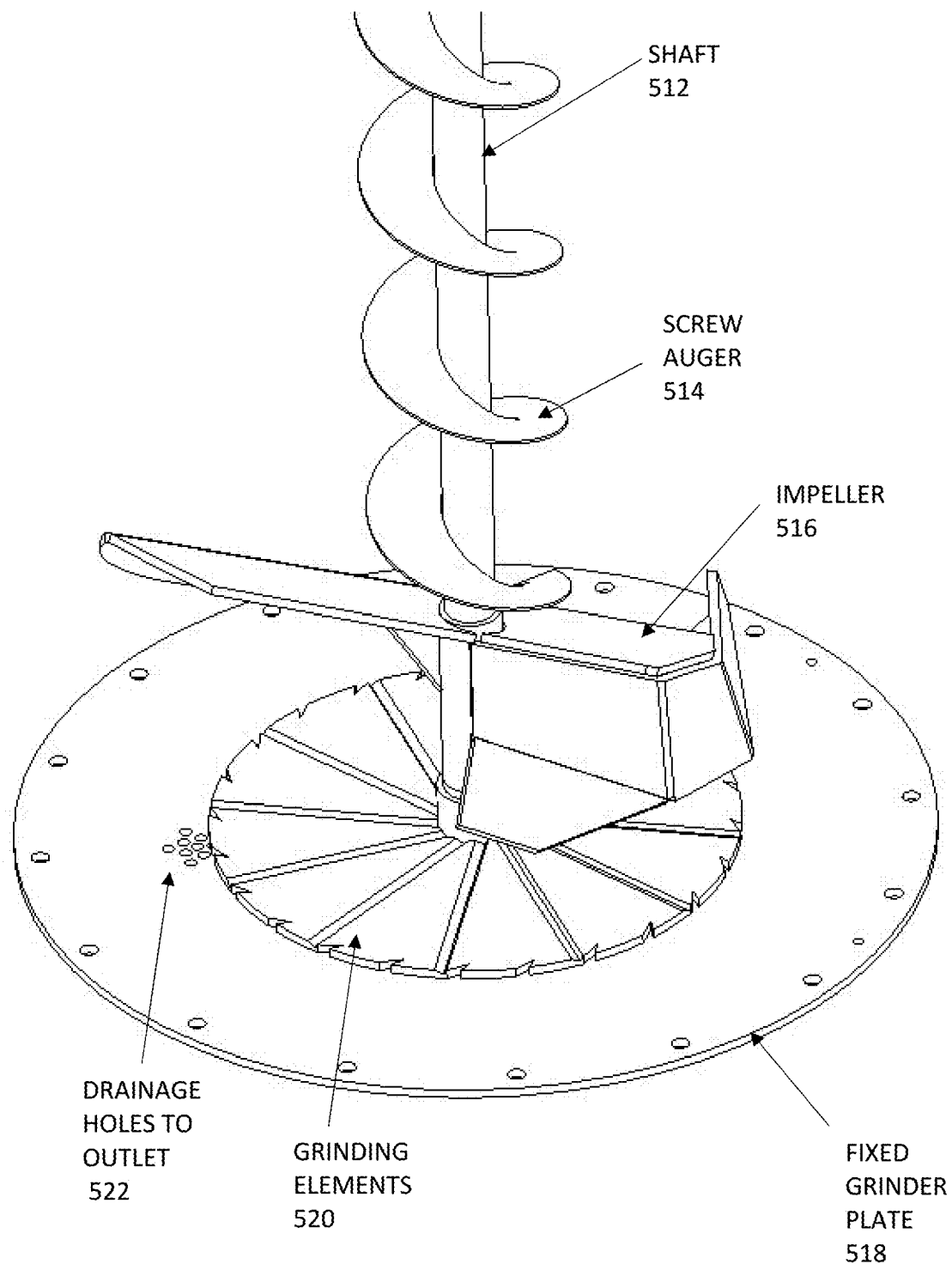
FIG. 10 is a schematic diagram showing a detailed perspective view of the top of the fixed grinding plate and nearby components, in accordance with certain exemplary embodiments.

FIG. 10 is a schematic diagram showing a detailed perspective view of the top of the fixed grinding plate 518 and nearby components, in accordance with certain exemplary embodiments. Among other things, the top of the fixed grinding plate 518 includes various grinding elements 520 including row grinding elements and raised blades. The fixed grinding plate 518 also includes a set of drainage holes 522 leading to the outlet 508 (not shown in this view) on the bottom side of the plate 518. Among other things, the drainage holes 522 act as a strainer to allow only liquified contents (i.e., contents sufficiently small) to pass through to the outlet 508. The shape of the holes and reliefs in the fixed grinding plate 518 enhance throughput of desired particle size while avoiding clogging. As mentioned above, the interaction between the bottom impeller 516 and the fixed grinding plate 518 uses force to wipe across the tank outlet holes 522 to effectively clear clogs and force material through the outlet 508 to be used in the subsequent process.

Figure 11:
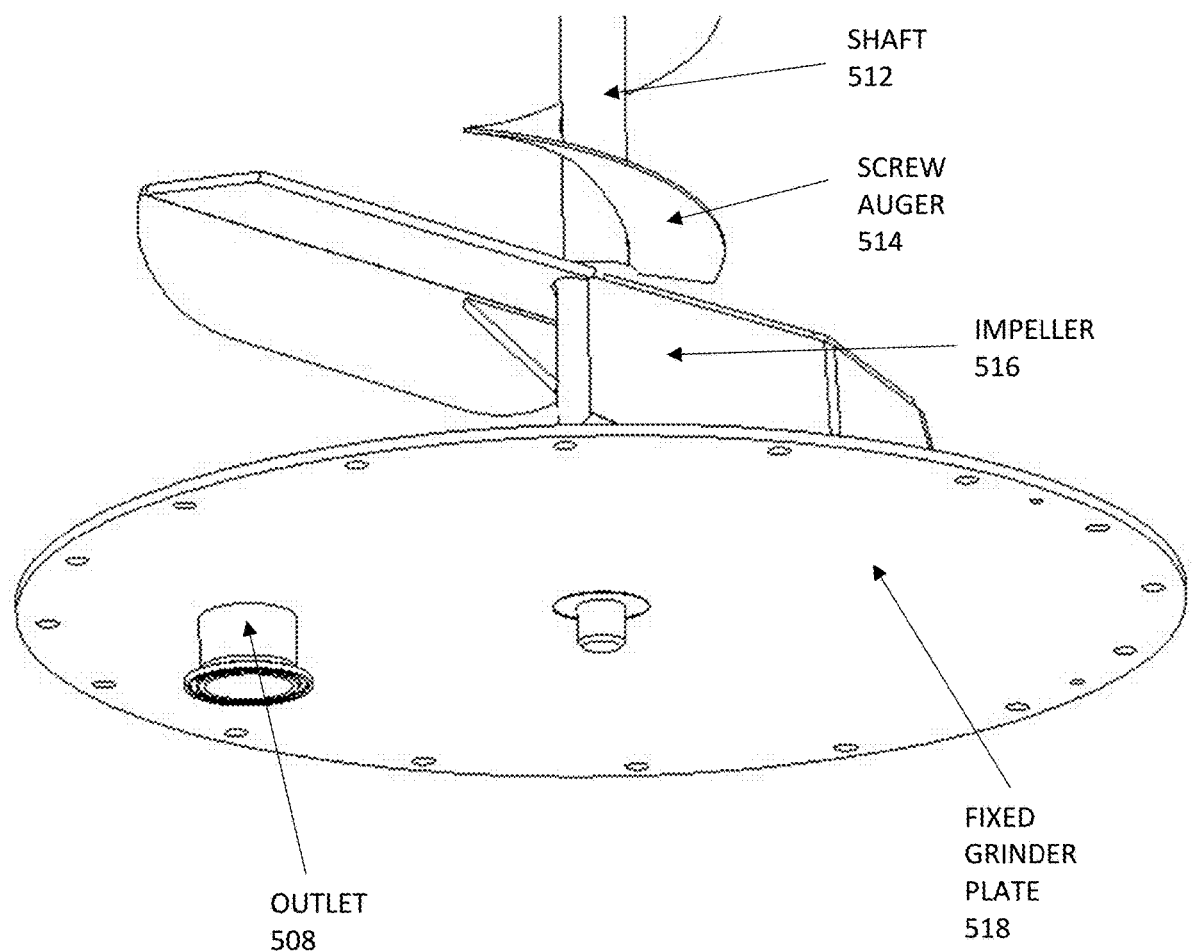
FIG. 11 is a schematic diagram showing a detailed perspective view of the bottom of the fixed grinding plate and nearby components, in accordance with certain exemplary embodiments.

FIG. 11 is a schematic diagram showing a detailed perspective view of the bottom of the fixed grinding plate 518 and nearby components, in accordance with certain exemplary embodiments.

Figure 34:
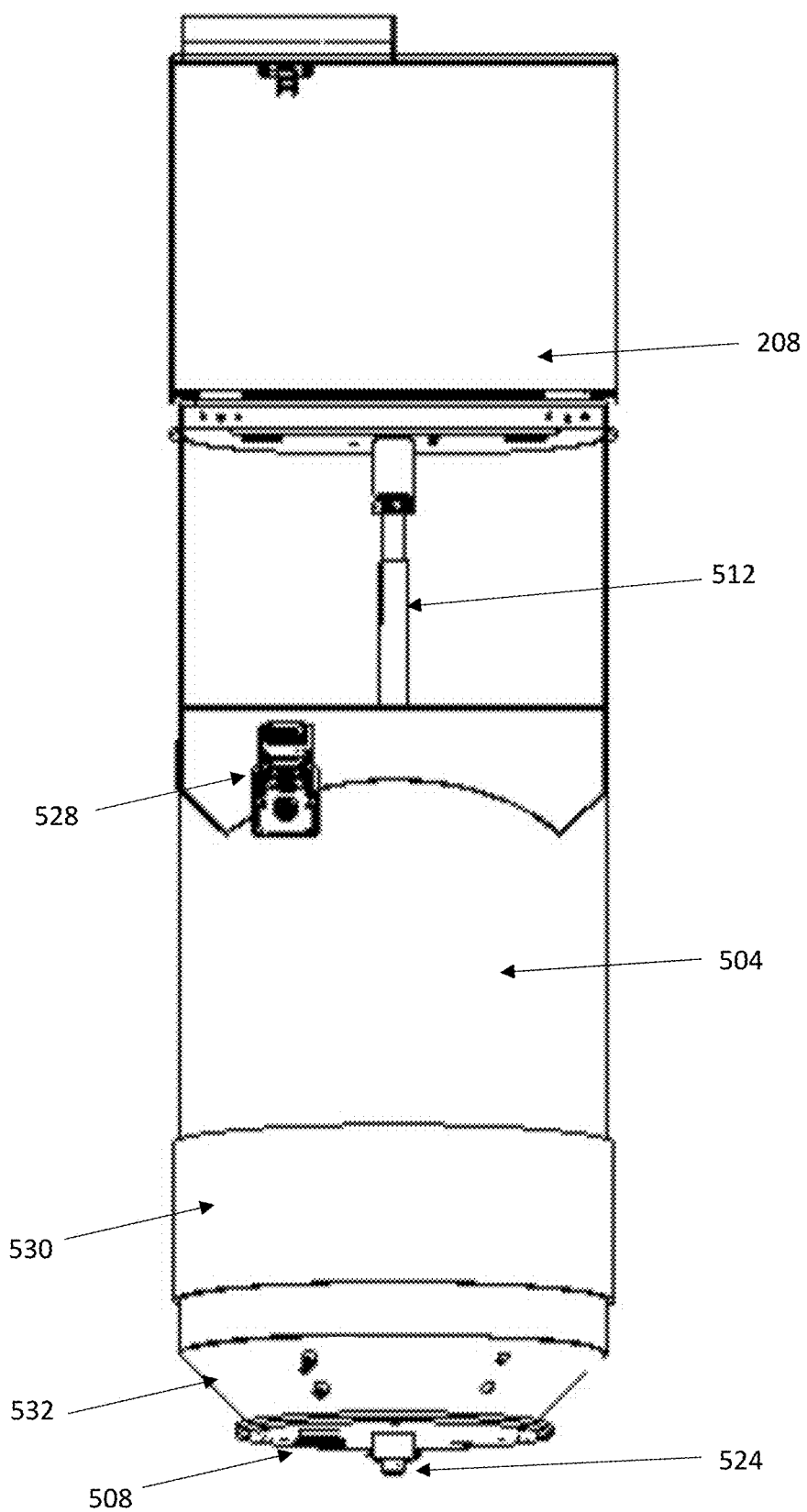
FIG. 34 is a front view of an alternative liquification system with the hopper door open.
Figure 35:
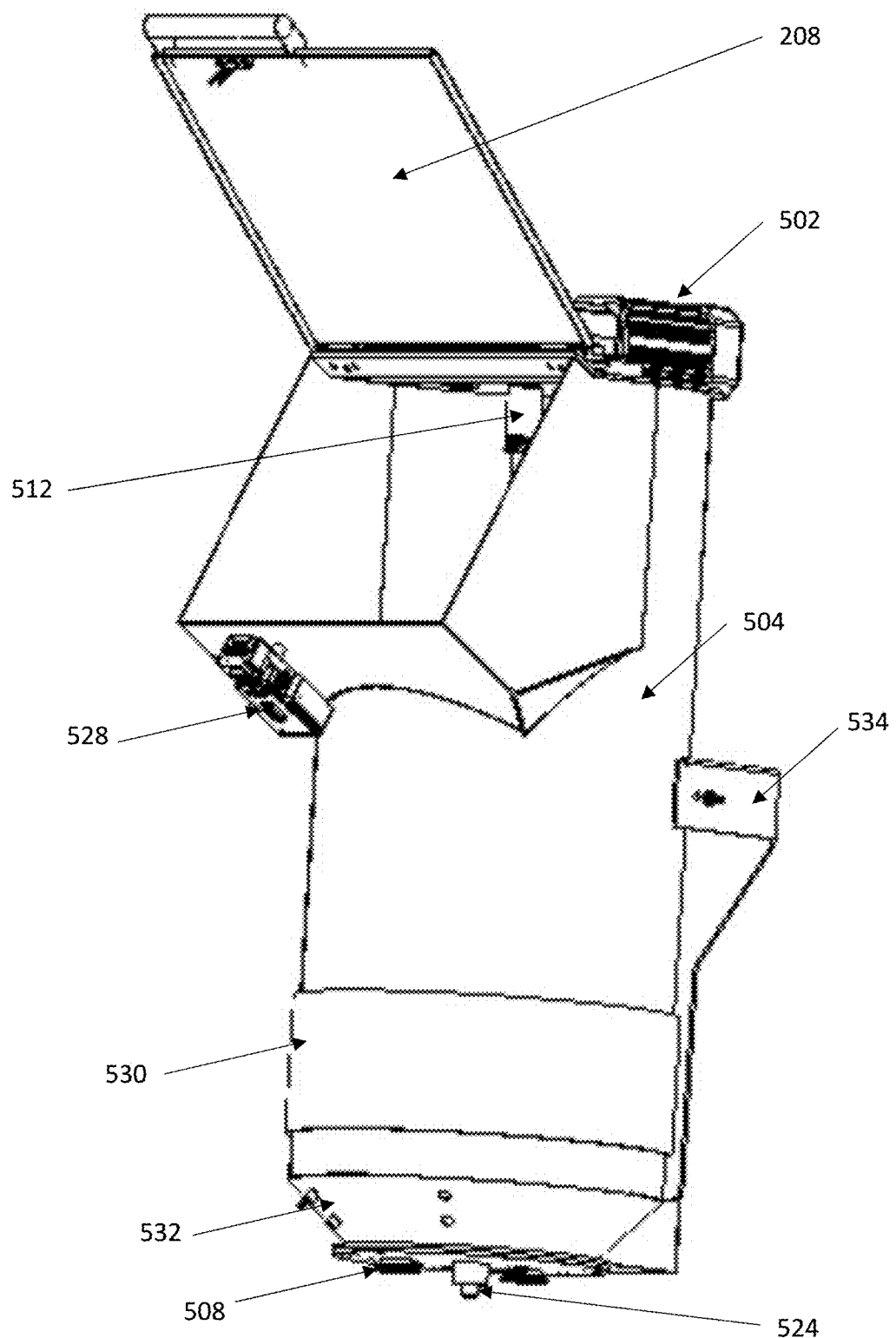
FIG. 35 is a right perspective view of the view of the alternative liquification system of FIG. 34.
Figure 36:
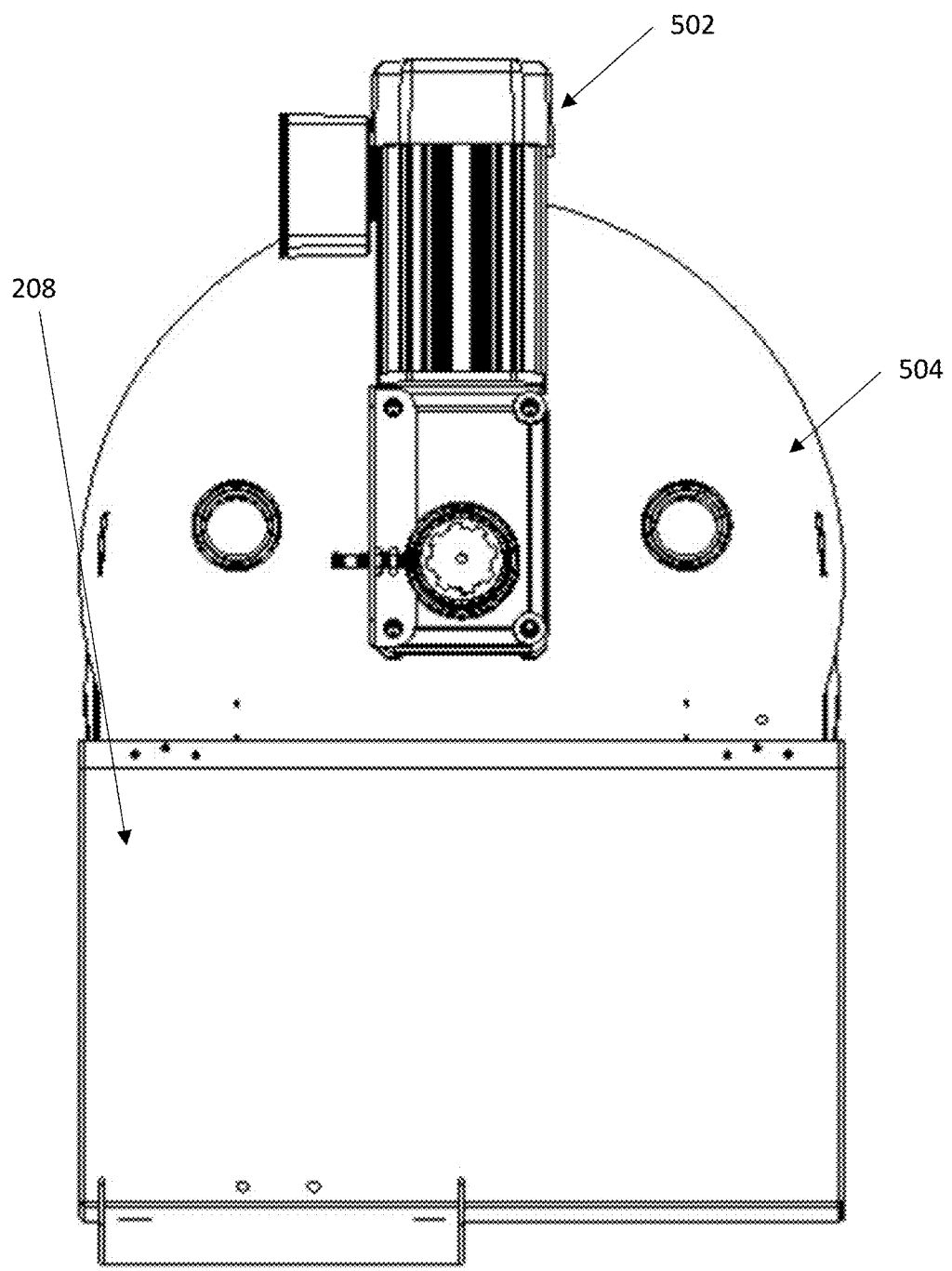
FIG. 36 is a top view of the alternative liquification system of FIG. 34.
Figure 37:
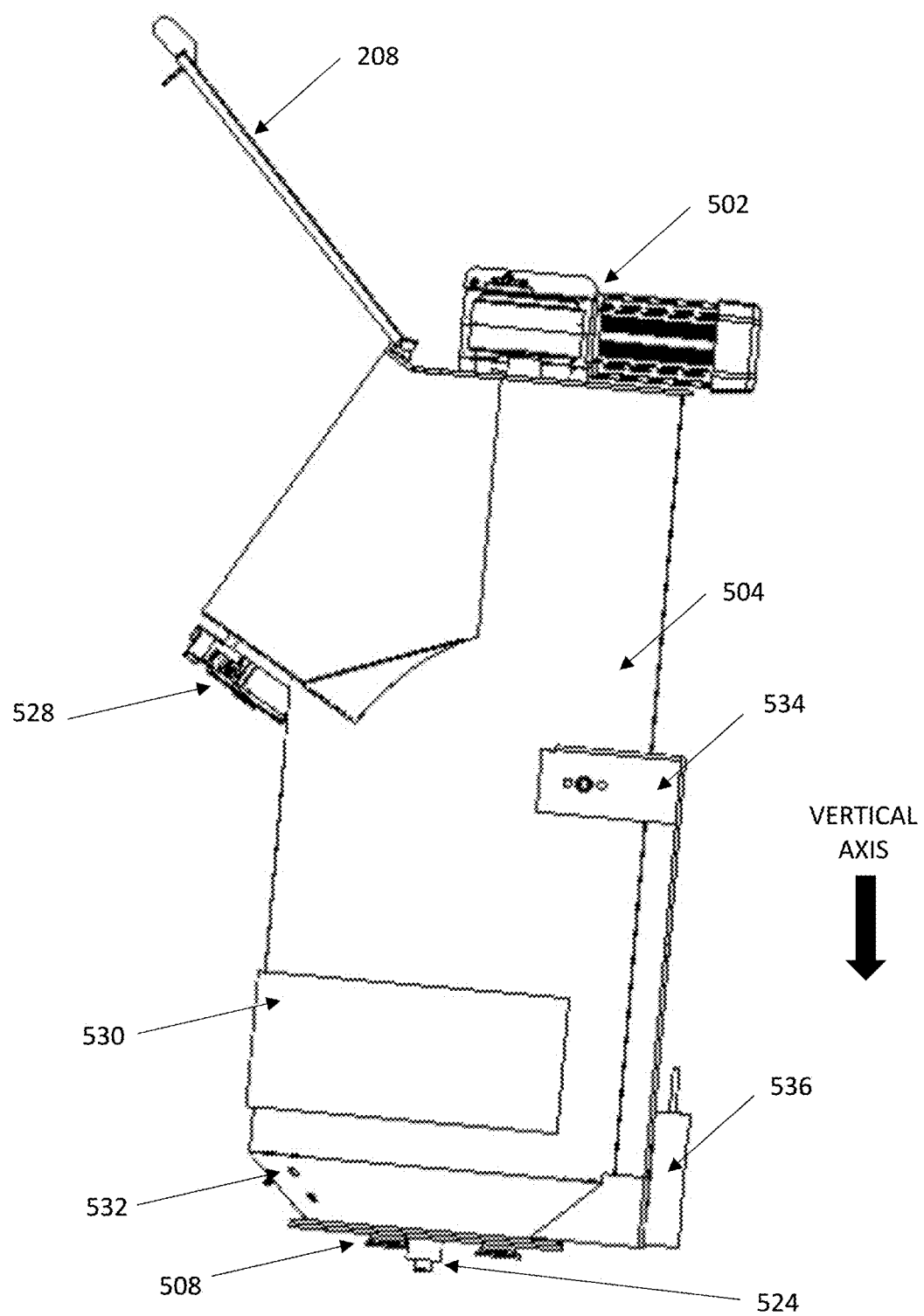
FIG. 37 is a right side view of the alternative liquification system of FIG. 34.
Figure 38A:
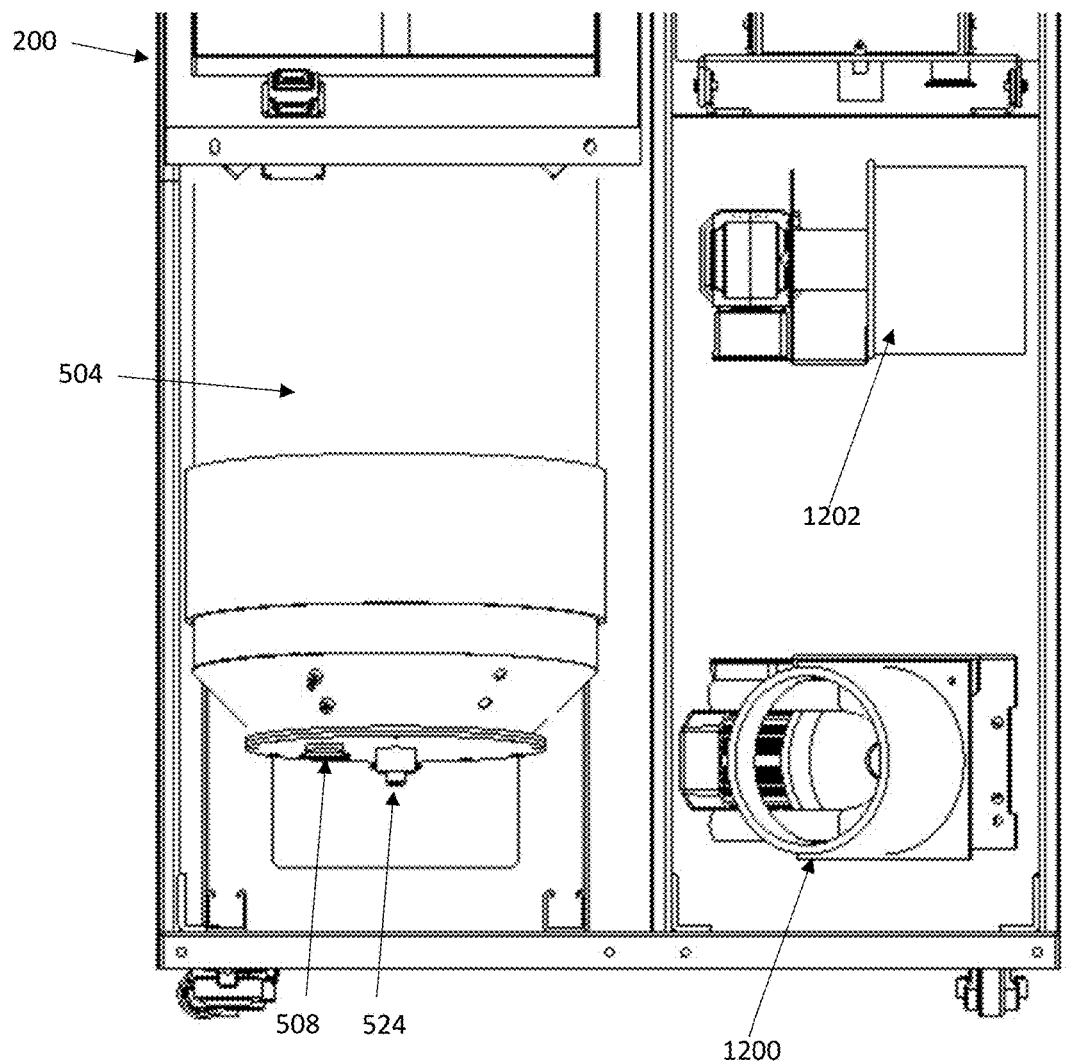
FIG. 38A shows a front view of the alternative liquification system with door and panel removed to show the lower portion of the liquification system and two pumps.
Figure 38B:
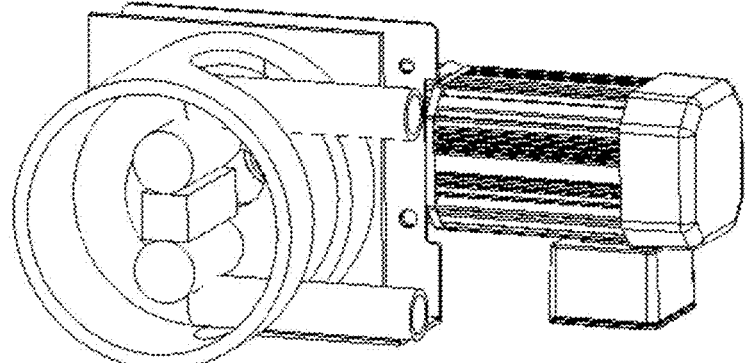
FIG. 38B is a detailed view of one of the pumps shown in FIG. 38A.
Figure 39:
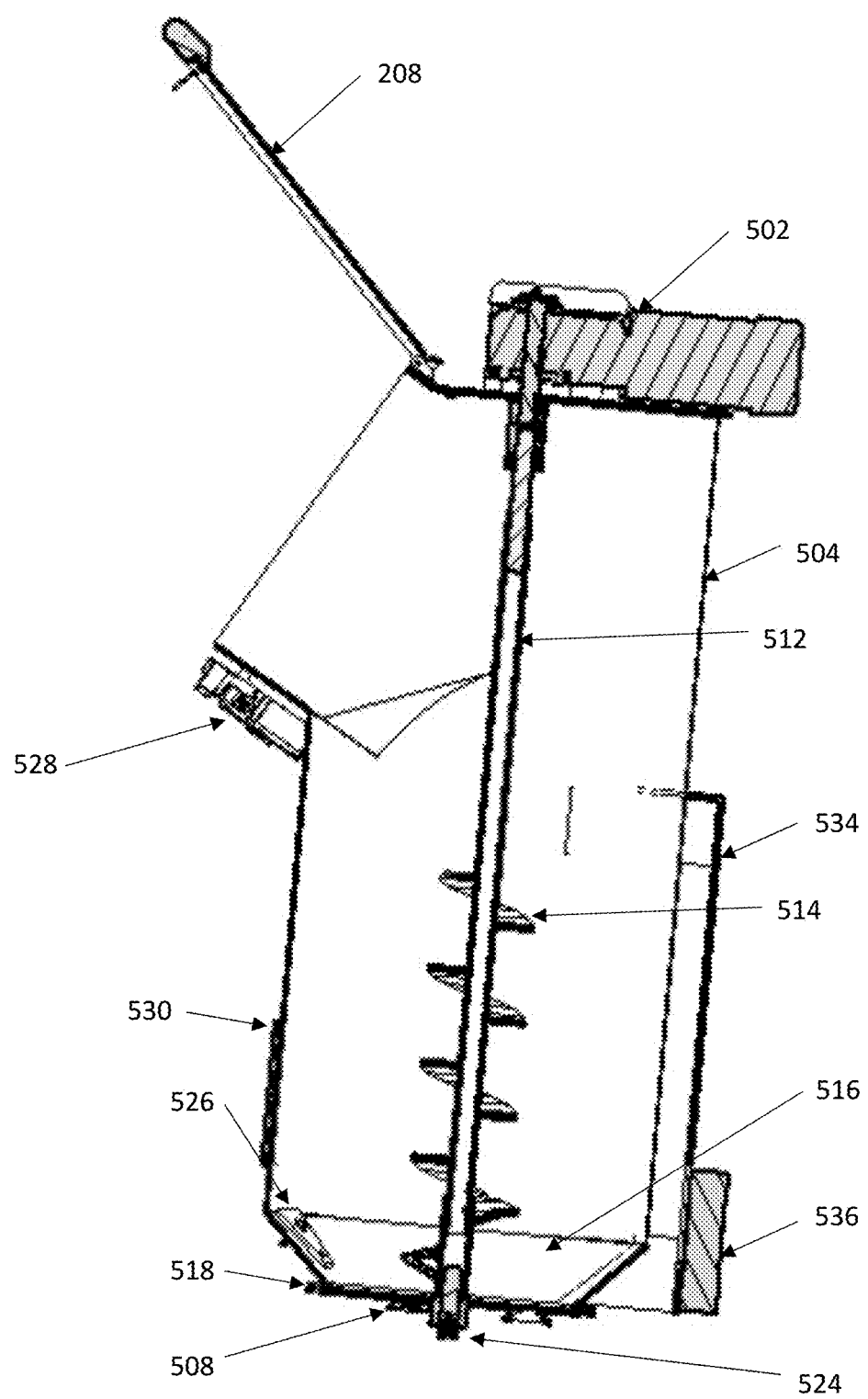
FIG. 39 is a right side cutaway view of the alternative liquification system of FIG. 34.
Figure 40:
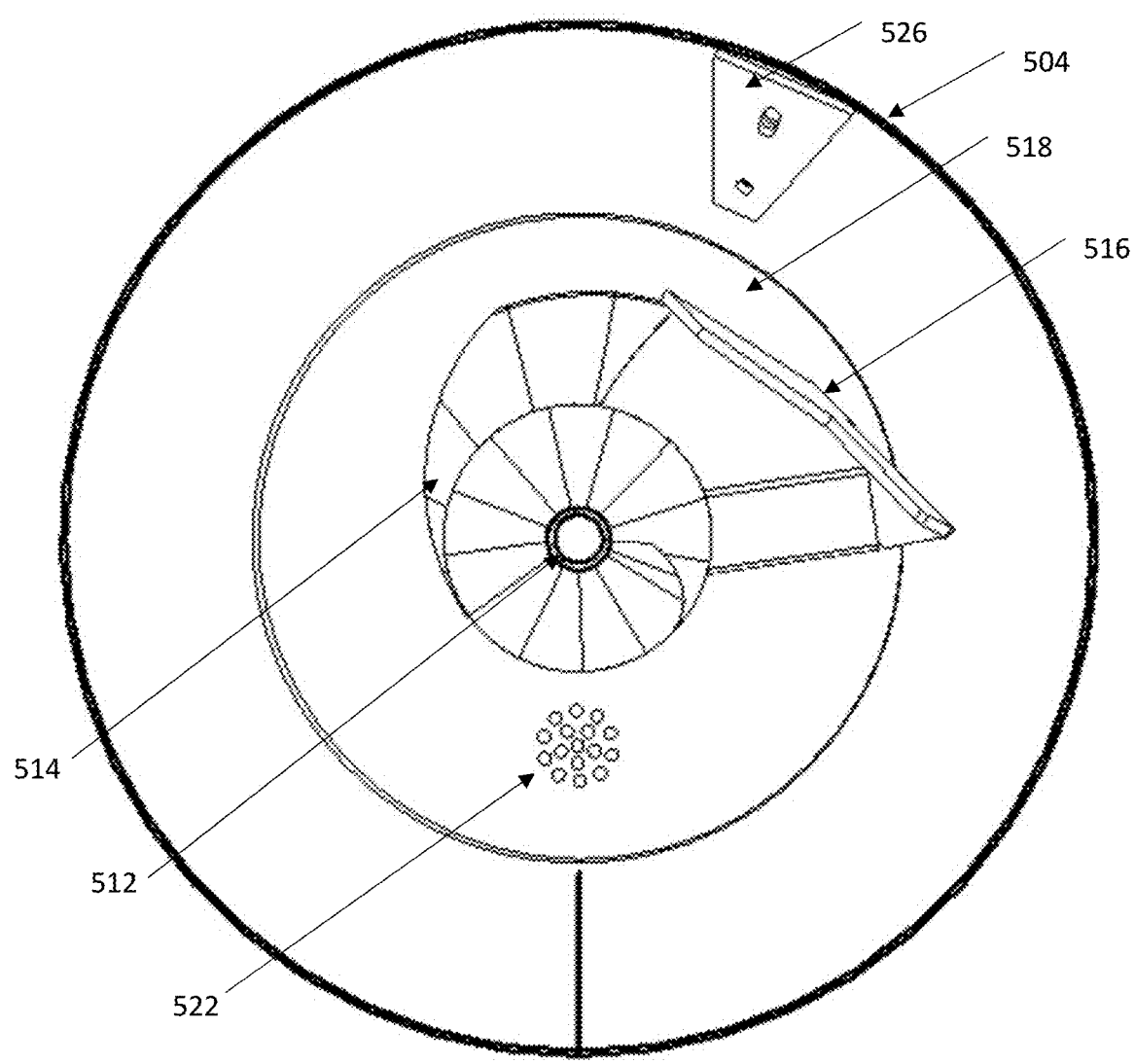
FIG. 40 is a top cutaway view of the alternative liquification system of FIG. 34.
Figure 41A:
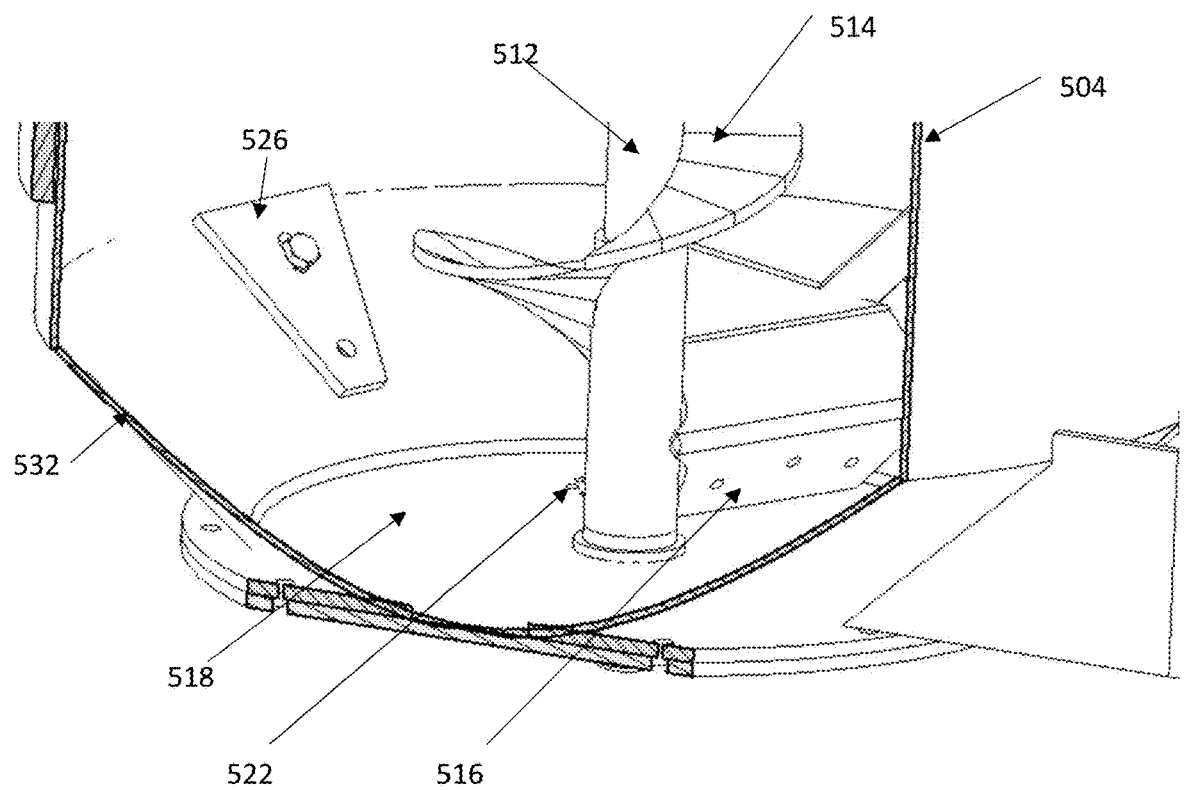
FIG. 41A is a first detailed view of the bottom portion of the alternative liquification system of FIG. 34.
Figure 41B:
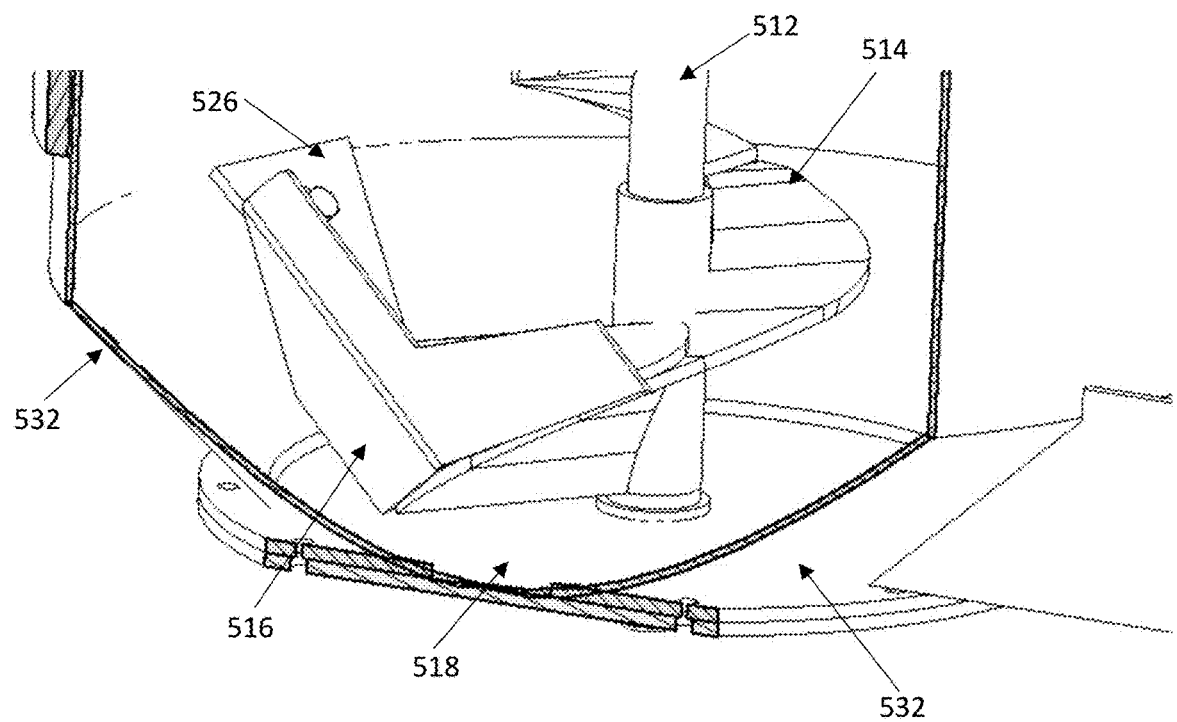
FIG. 41B is a second detailed view of the bottom portion of the alternative liquification system of FIG. 34.
Figure 42:
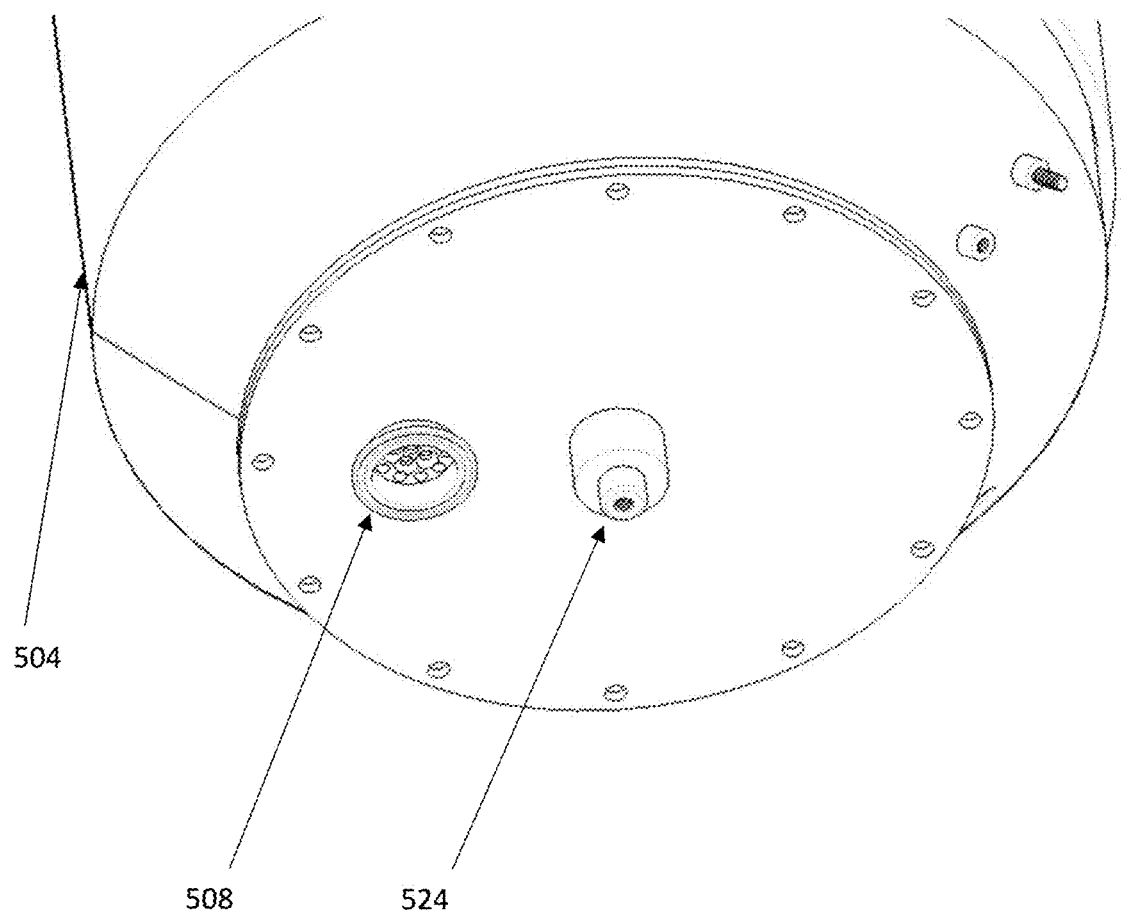
FIG. 42 is a perspective view of the outside bottom of the alternative liquification system of FIG. 34.
Figure 43:
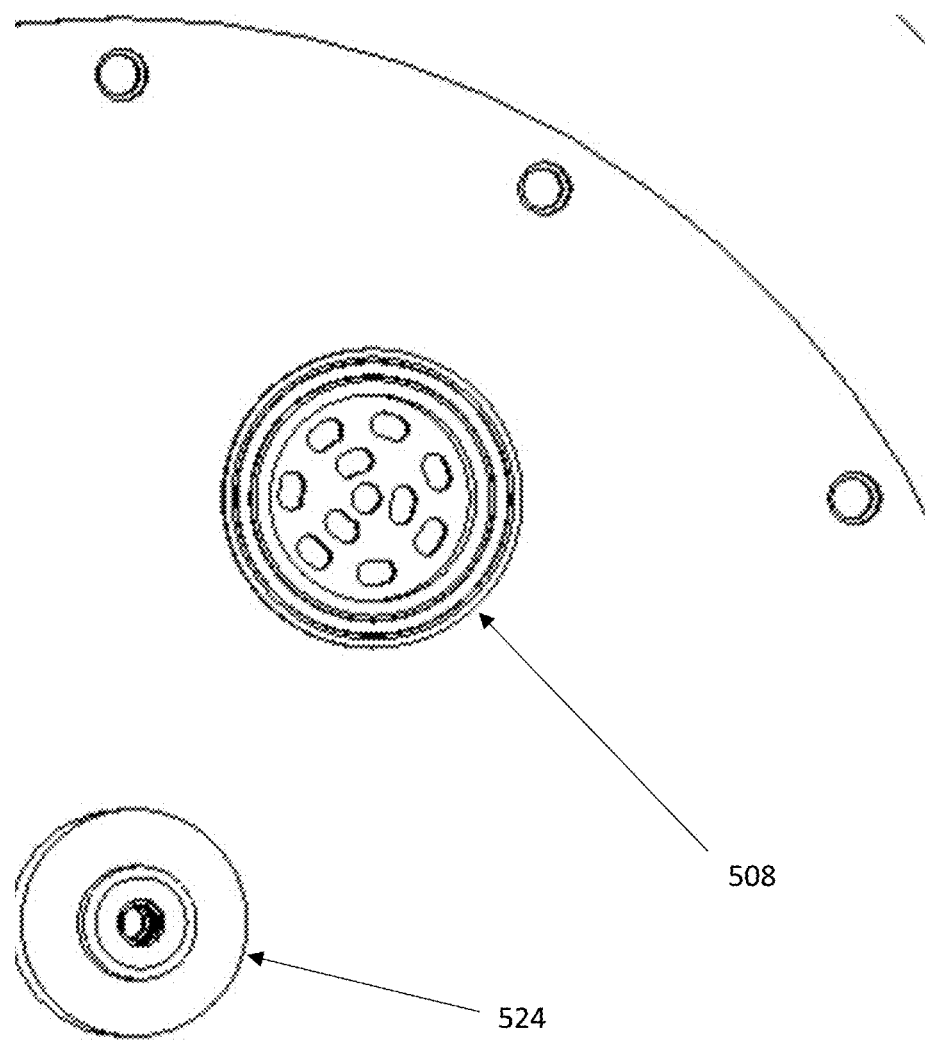
FIG. 43 is a detailed view of a portion of the outside bottom of the alternative liquification system of FIG. 34.
Figure 44:
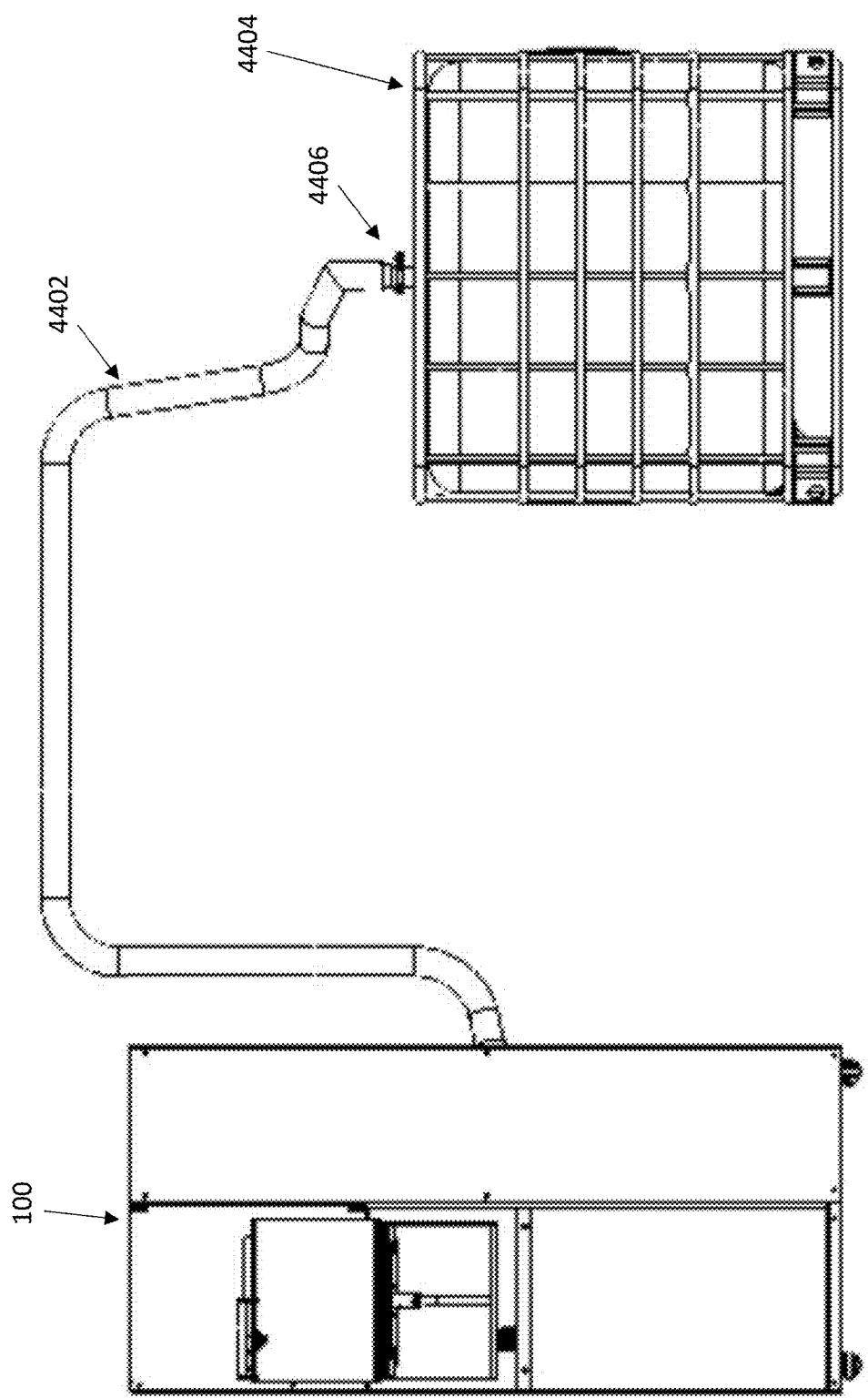
FIG. 44 schematically shows the alternative liquification system coupled to an external receptacle to which final product is pumped via a conduit.

FIGS. 34-43 are schematic diagrams showing details of an alternative liquification system 102 for the alternative self-contained organic waste management system 100 of FIGS. 29-33. Specifically, FIG. 34 is a front view of the alternative liquification system 102 with the hopper door 208 open to expose the inlet to the hopper 504 and a hopper door latch 528. FIG. 35 is a right perspective view of the view of the alternative liquification system 102 of FIG. 34 showing a hopper mounting bracket 534. FIG. 36 is a top view of the alternative liquification system 102 of FIG. 34. FIG. 37 is a right side view of the alternative liquification system 102 of FIG. 34 showing the offset from the vertical axis and also showing a hopper weighing device 536 for monitoring the weight of the contents of the hopper 504 by the controller 117. FIG. 38A shows a front view of the alternative liquification system 102 with door 206 and panel 210 removed to show the lower portion of the liquification system 102, pump 1200 used to pump effluent from the liquification system 102 to the boiler system 108, and a pump 1202 to pump final product to an external receptacle as depicted in FIG. 44. FIG. 38B is a detailed view of pump 1200 shown in FIG. 38A. FIG. 39 is a right side cutaway view of the alternative liquification system 102 of FIG. 34 showing a tapered (e.g., cone-shaped) portion at the bottom of the hopper that, among other things, can reduce the force required to mix contents and reduce jamming of the components. Also shown is a replaceable grinding element 526 on the cone section of the hopper 504 that allows for grinding through such things as bones, fibrous materials, fruit peels and skins, compostable cutlery, compostable packaging, pits, and other items that are traditionally hard to break down, which can create more surface area for biological interaction as well as break particles into smaller sizes, e.g., an acceptable size for fertilizer. FIG. 40 is a top cutaway view of the alternative liquification system 102 of FIG. 34. FIGS. 41A and 41B are detailed views of the bottom portion of the alternative liquification system 102 of FIG. 34. FIG. 42 is a perspective view of the outside bottom of the alternative liquification system 102 of FIG. 34. FIG. 43 is a detailed view of a portion of the outside bottom of the alternative liquification system 102 of FIG. 34.

It should be noted that, in these exemplary embodiments, the components of the liquification system 102 are generally arranged in a vertical orientation but offset from the vertical axis (as depicted in FIGS. 6 and 9 and 37) such that the fixed grinding wheel 518 is oriented at an angle relative to the horizontal axis with the outlet 508 on the lower side of the fixed grinding plate 518 to assist with drainage of the liquified organic waste. Among other things, the vertical orientation helps with mixing and drainage, e.g., through gravity-assisted settling and draining of the contents, and the bottom grinding allows for a wider range of organic waste (e.g., larger bones and stonefruits) and helps to provide a continuous-feed capability in which additional organic waste can be added to the liquification system 102 essentially on an ongoing basis.

It also should be noted that, in these exemplary embodiments, the motor 502 is located at the top of the liquification system assembly 102 and outside of the hopper 504 in order to avoid components such as the motor 502 and related bearings and seals from contamination by the contents of the hopper 504 and also to assist with servicing of the components if needed.

It also should be noted that, in these exemplary embodiments, water generally is not added to the liquification system 102, as the screw auger 514, impeller 516, and fixed grinding plate 518 are expected to sufficiently liquefy or pulverize organic waste such as food waste without added water. Among other things, operation without adding water can be considered more environmentally friendly both in using less water and in requiring less energy consumption such as for water separation, dehydration, and/or drying. However, in alternative embodiments, the system optionally can include a water inlet for the liquification system 102 such as for connection to a customer water source or for receiving water recycled or recovered from other parts of the system (e.g., condensed from boiler system 108 exhaust, from pre-boiler or post-boiler water separation, etc.). Among other things, added water could allow materials to be held longer in the liquification system 102 such to wait for additional organic waste to be added before operating the liquification system 102.

It also should be noted that, in these exemplary embodiments, the liquification system 102 may include a heater 530 (e.g., an electric blanket and insulation) that can be used to heat the contents of the hopper 504, e.g., under the control of the controller 117. Additionally or alternatively, the system can utilize other heat sources for the liquification system 102 (e.g., heat recycled from other parts of the system such as exhaust from the boiler system 108 or from the optional dryer system 112, waste heat provided by a customer system such as an HVAC system, etc.). Among other things, added heat could allow organic waste to be liquified more quickly or efficiently, e.g., due to thermal breakdown of the organic waste and/or increased microbial activity. However, in alternative embodiments, the system 100 can exclude a heater for the liquification system 102 or under some conditions can operate the liquification system 102 without adding heat, e.g., when the screw auger 514, impeller 516, and fixed grinding plate 518 are expected to sufficiently liquefy or pulverize organic waste such as food waste without added heat or when the contents of the liquification system 102 generate heat such as from microbial activity. Among other things, excluding a heater can simplify the system, and operation without adding heat (especially, say, from an electric heater) can be considered more environmentally friendly by requiring less energy consumption.

It also should be noted that any of a variety of additives or treatments (e.g., biological or microbial additives or other treatments) can be added to the hopper 504 such as to improve processing rate or improve quality of the liquefied organic waste product 103. Such material may be added, for example, manually through the hopper door 208 or automatically via one or more inlets to the hopper 504, e.g., pumped into the hopper 504 under the control of the controller 117.

The liquification system 102 generally includes various sensors such as to sense weight of the contents of the hopper 504, to sense temperature of the contents of the hopper 504, and to sense a jam condition (e.g., preventing the shaft 512 from rotating in a particular direction). For example, the hopper door 208 could be locked if the weight of the contents of the hopper 504 exceeds a predetermined maximum (or nominal) capacity, temperature could be controlled (e.g., increased or decreased) such as by controlling mixing speed and/or mixing direction or by controlling one or more heat sources (e.g., a heating element or blanket), and the motor 502 could be reversed or cycled in order to try to unjam the shaft 512). Of course, sensors could be used in other ways and other types of sensors could be included, e.g., to control process parameters such as to improve the liquified organic waste product 103 or reduce the amount of time needed to break down the contents (which is generally based at least in part on the weight and composition of the contents). Embodiments can include other process enhancements, e.g., exhaust for odor reduction or pressure relief (e.g., if biological processes generate elevated pressures within the hopper 504), separators for moisture or oil reduction, automatic dosing of biological or other additives (which could include water such as to control the consistency of the contents), etc.

At an appropriate time, the liquefied organic waste product 103 from the liquification system 102 is provided to the next stage of the process (e.g., to the boiler system 108 or alternatively to one or more pre-boiler processors 106 or one or more collection receptacles 116). In certain exemplary embodiments, the liquified organic waste product 103 from the outlet 508 of the liquification system 102 is pumped directly or indirectly to an inlet at the next stage (e.g., a pump may be coupled directly to the outlet, or the liquified organic waste product 103 may be held in a temporary storage device from which it is pumped), although it should be noted the liquefied organic waste product 103 can be transmitted in other ways, e.g., by gravity rather than by pump. FIG. 12 is a schematic diagram showing a pump 1200

(e.g., a hose pump or other appropriate pump type) attached directly to the outlet of the liquification system 102, in accordance with certain exemplary embodiments. FIG. 13 is a schematic diagram showing a detailed perspective view of the pump 1200 of FIG. 12. Suitable fittings to which hosing or other conduit is attached can be provided at the outlet 508 of the liquification system 102 and/or at an inlet of the next stage. The liquification system 102 may include a sensor or other mechanism to determine when an appropriate amount of liquified organic waste product 103 is available and to send a signal to the control system 117, which then can engage the pump 1200. Optionally, the pump 1200 may sense when an appropriate amount of liquified organic waste product 103 is available and either activate to pump the liquified organic waste product 103 or send a signal to the control system 117, which then can engage the pump 1200.

Optional Pre-Boiler Processors

The system may include any of various types of pre-boiler processors 106 for processing liquified organic waste product 103 prior to introduction into the boiler system 108, such as, for example and without limitation, a water separation processor that removes water from the liquified organic waste product 103 and/or an oil separation processor that removes oil (e.g., grease or other oils) from the liquified organic waste product 103. Among other things, such pre-boiler processor(s) 106 could reduce the weight or volume of material to be processed by the boiler system 108, which in turn could reduce the amount of energy required by the boiler system 108 and/or the amount of process time needed for the boiler system 108. Recovered water could be recycled for use within the system 100, e.g., as a source of water that could be used in the liquification system 102, or could be collected such as for use as a separate fertilizer or to be recycled, discarded, or used in other ways. Recovered oil could improve the quality of the dehydrated product introduced into the boiler system 108 and also could provide a source of oil such as for use as a fuel source or simply could be recycled or discarded.

Optional Boiler System

After liquification and any optional pre-boiler processes, the resulting material may be provided to an optional boiler system 108, where it is dehydrated until the contents reach a predetermined water content level. Generally speaking, the purpose of the boiler system 108 is to remove water from the material without burning it. The boiler system 108 can use any of a variety of heat sources such as for example, gas, electric, solar, etc.

Figure 14:
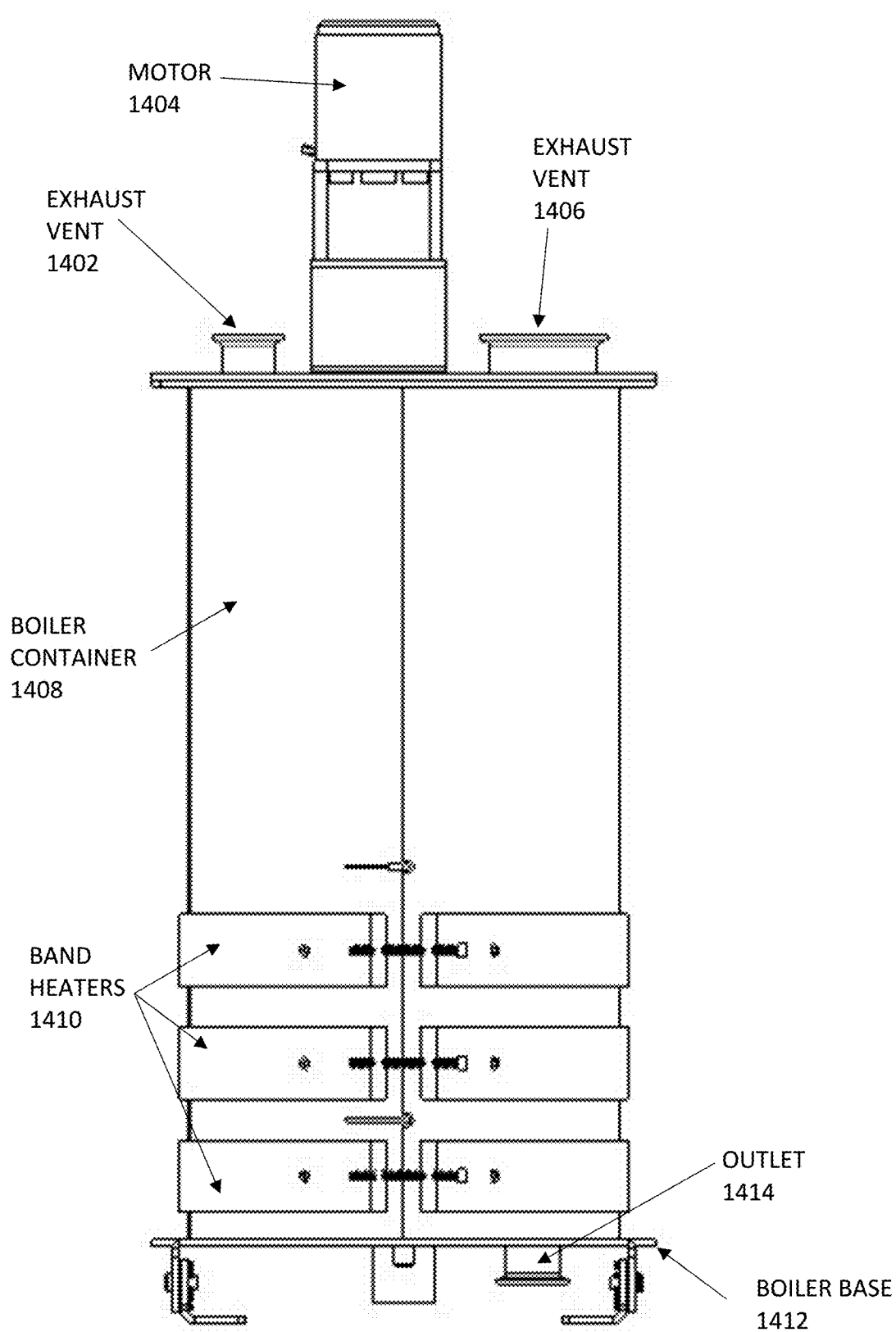
FIG. 14 is a schematic diagram showing a front view of a boiler system, in accordance with certain exemplary embodiments.
Figure 15:
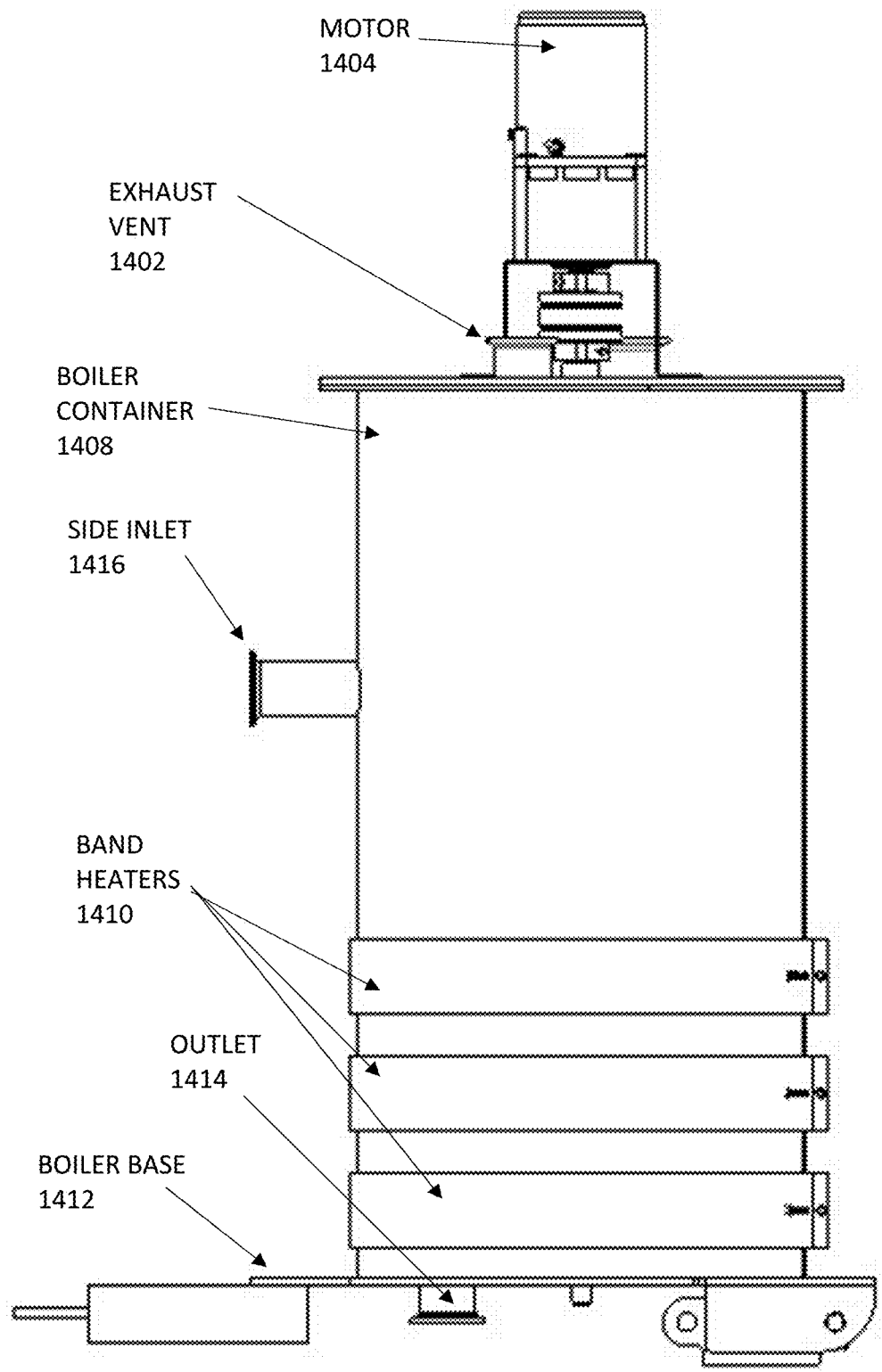
FIG. 15 is a schematic diagram showing a side view of the boiler system of FIG. 14.
Figure 16:
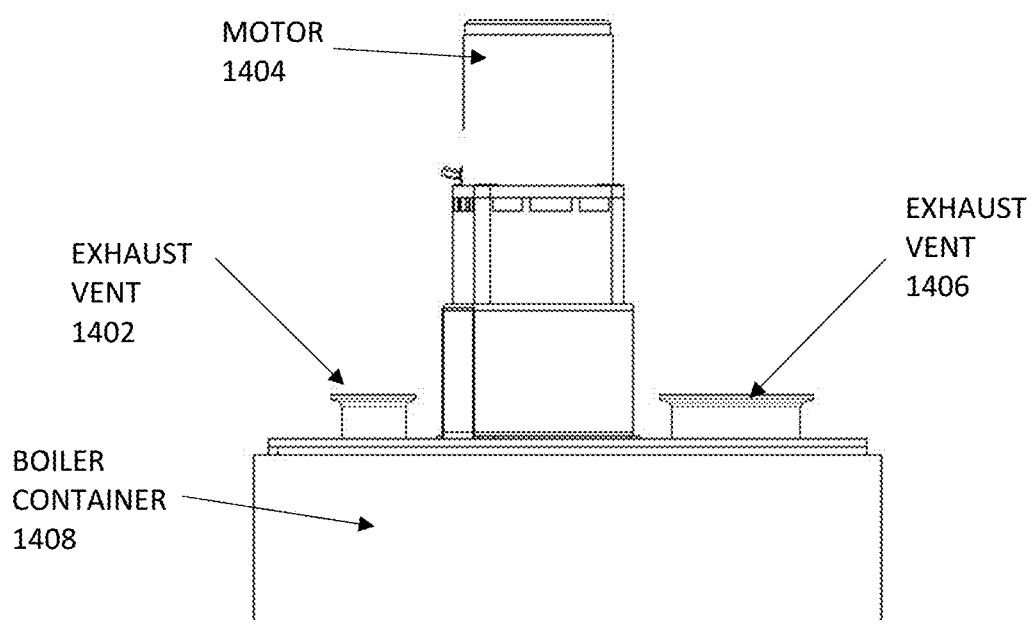
FIG. 16 shows details of the top portion of the boiler system of FIG. 5 including the boiler container, motor, and exhaust vents.

FIGS. 14 and 15 are schematic diagrams respectively showing a front view and a side view of the boiler system 108, in accordance with certain exemplary embodiments. Among other things, the boiler system 108 includes a boiler container 1408 supported by a boiler base 1412 for holding the material to be dehydrated, a number of band heaters 1410 that encircle portions of the boiler container 1408 to provide heat, a side inlet 1416 for receiving material to be dehydrated, a bottom outlet 1414 through which condensed organic waste product 109 passes out of the boiler system 108, a motor 1404 for operating various internal components (described below), and various exhaust vents 1402, 1406 such as for ventilating steam produced during the dehydration process. FIG. 16 shows details of the top portion of the boiler system of FIG. 5 including the boiler container 1408, motor 1404, and exhaust vents 1402, 1406.

Figure 17:
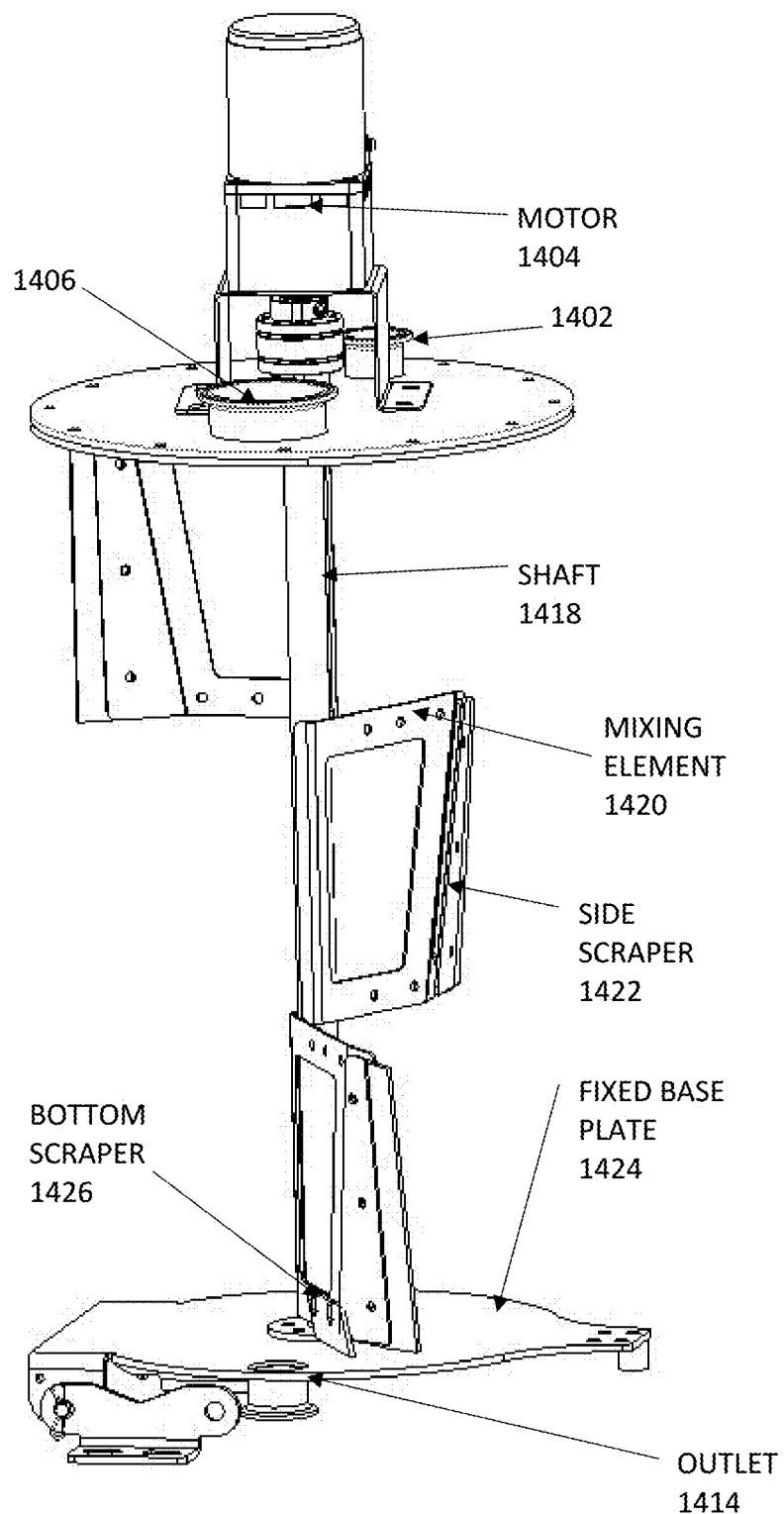
FIG. 17 is a schematic diagram showing relevant inner components of the boiler system, in accordance with certain exemplary embodiments.

FIG. 17 is a schematic diagram showing relevant inner components of the boiler system 108, in accordance with certain exemplary embodiments. Among other things, the boiler system 108 includes a shaft 1418 that is rotated relative to a fixed base plate 1424 by the motor 1404. The shaft 1418 includes a number of mixing paddles or elements 1420 (three in this example) to assist with movement and mixing of the contents within the boiler container 1408 during the dehydration process. In this example, each mixing element 1420 includes a side scraper 1422 to help prevent build-up of material on the inside surface of the boiler container 1408, and the bottom mixing element 1420 additionally includes a bottom scraper 1426 to help prevent build-up of material on the top surface of the fixed base plate 1424 and also to help direct condensed organic waste product 109 toward the outlet 1414. Thus, the walls of the heated container 1408 are self-cleaning via an internal wiper system so that product can be evenly heated such as to kill pathogens and reduce moisture content so that material can be safely stored within the boiler system 108 or elsewhere. The boiler system 108 includes one or more exhaust vents 1402, 1406 to allow for ventilation of steam, and the system may include an exhaust fan, exhaust ducts, and other exhaust components. The boiler system 108 generally includes various sensors such as to sense weight and temperature of the contents of the container 1408 for monitoring weight reduction (e.g., due to evaporation) and throughput.

Optional Post-Boiler Processors

The system may include any of various types of post-boiler processors 110 for processing the condensed organic waste product 109 prior to introduction into the optional dryer system 112 or collection into one or more collection receptacles, such as, for example, a water separation processor that removes water from the condensed organic waste product 109 and/or an oil separation processor that removes oil (e.g., grease or other oils) from the condensed organic waste product 109. Among other things, such post-boiler processor(s) could reduce the weight or volume of material to be dried or collected, which in turn could reduce the amount of energy required by the optional dryer system 112 and/or the amount of process time needed for the optional dryer system 112. Recovered water could be recycled for use within the system 100, e.g., as a source of water that could be used in the liquification system 102, or could be collected such as for use as a separate fertilizer or to be recycled, discarded, or used in other ways. Recovered oil could improve the quality of the dehydrated product prior to collection or introduced into the optional dryer system 112 and also could provide a source of oil such as for use as a fuel source or to be recycled or discarded. Exhaust from the boiler system 108 could be filtered and/or condensed to recover water, which could be recycled for use within the system 100, e.g., as a source of water that could be used in the liquification system 102. Excess heat from the boiler system 108 or boiler system exhaust could be used, for example, as a heat source for the liquification system 102 or for the optional dryer system 112.

Optional Dryer Subsystem

Figure 18:
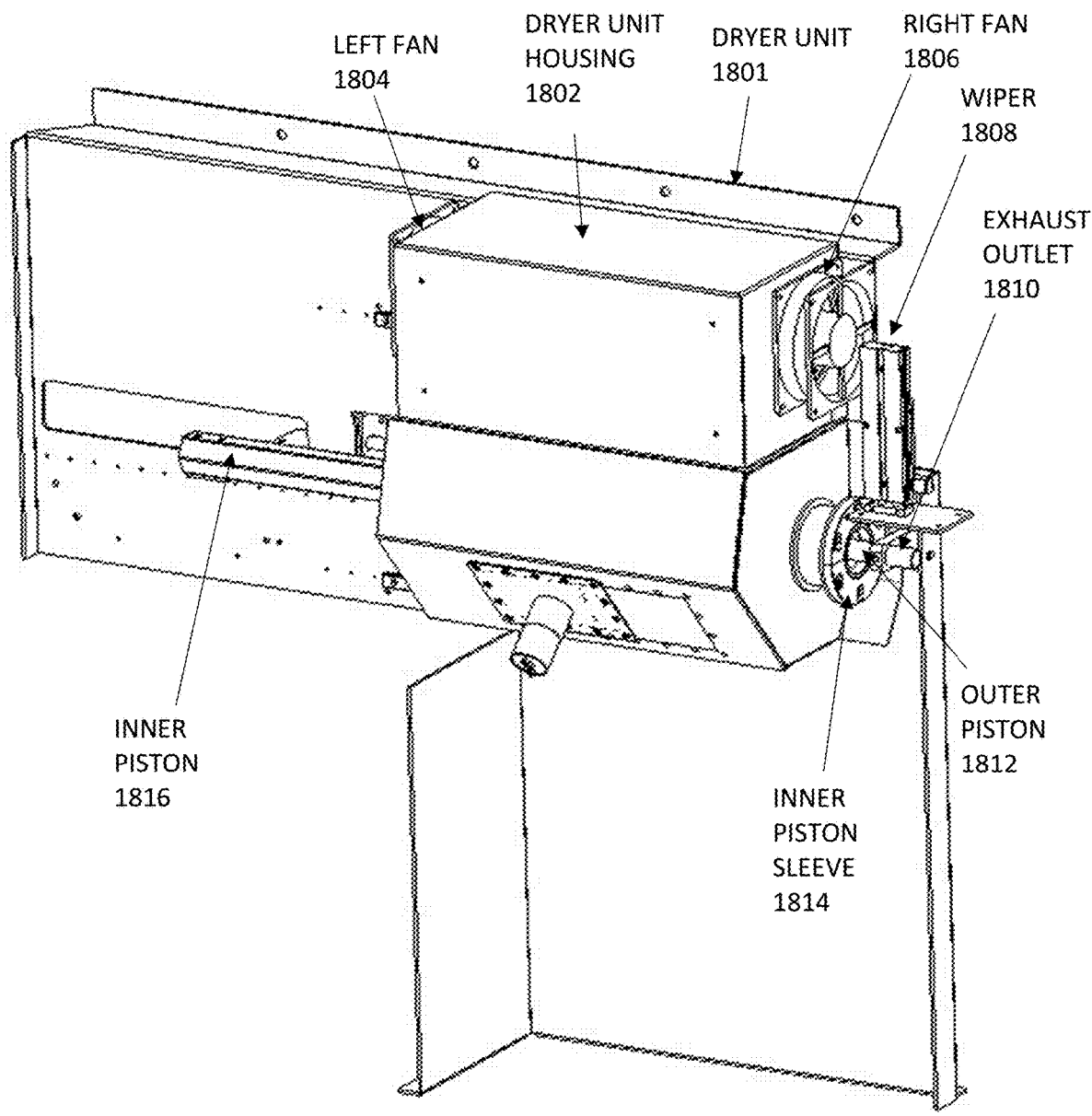
FIG. 18 is a schematic diagram showing a perspective view of a dryer system, in accordance with certain exemplary embodiments.

FIG. 18 is a schematic diagram showing a perspective view of a dryer system 112, in accordance with certain exemplary embodiments. Among other things, the dryer system 112 includes a dryer unit 1801 having various external components such as a dryer unit housing 1802 and a pair of ventilation fans labeled for convenience as the left fan 1804 and the right fan 1806. The dryer system 112 also includes two pistons labeled for convenience as the outer piston 1812 and the inner piston 1816. The inner piston 1816 is movable within an inner piston sleeve 1814, which is part of the dryer unit 1801 and which acts as the drying chamber. Movement of the inner piston 1816 is controlled by an inner piston actuator 1818 (hidden in this view). In this exemplary embodiment, the dryer unit 1801 including the inner piston sleeve 1814 is movable relative to both the inner piston 1816 and the outer piston 1812, which in this exemplary embodiment is stationary (although it could be movable in various alternative embodiments) and is configured to mate with the open end of the inner piston sleeve 1814 when in a closed configuration. Movement of the dryer unit 1801 is controlled by a dryer unit actuator 1822, which is hidden in this view but shown in other views described below. Without limitation, the actuators 1818, 1822 may be operated electronically, hydraulically, pneumatically, or by other mechanism. The inner piston 1816 and the dryer unit 1801 are moved relative to one another and relative to the outer piston 1812 during a drying process that includes injecting material into the inner piston sleeve 1814 (which acts as a drying chamber), closing off the drying chamber by the outer piston 1812, drying the material in the drying chamber (which, in this exemplary embodiment, is done using microwave heating although other forms of drying may be used in various alternative embodiments), and ejecting the dried material from the drying chamber. In this exemplary embodiment, the material to be dried is introduced into the drying chamber through the inner piston 1816. During the drying process, air also may be introduced into the drying chamber through the inner piston 1816, while steam is vented through an exhaust outlet in the outer piston 1812. The dryer system 112 also includes a wiper 1808 to break off dried material ejected from the drying chamber and clean the surfaces of the two pistons 1812, 1816.

Figure 19:
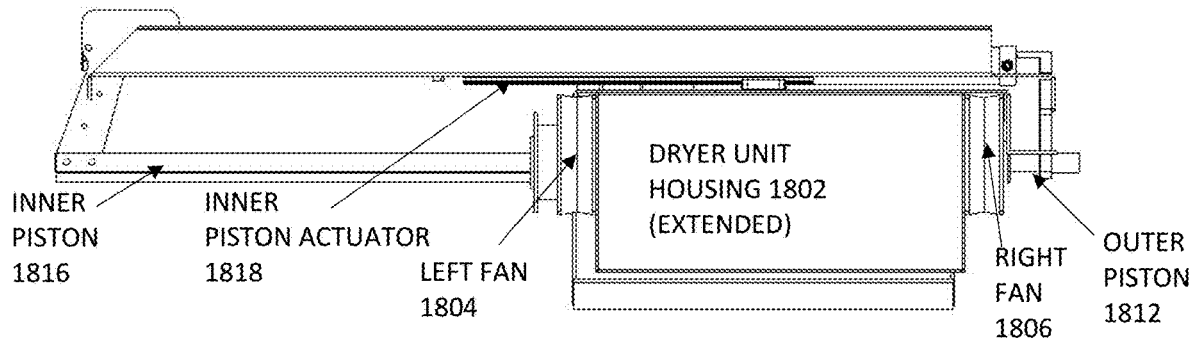
FIG. 19 is a schematic diagram showing a top view of relevant components of the dryer system of FIG. 18.
Figure 20:
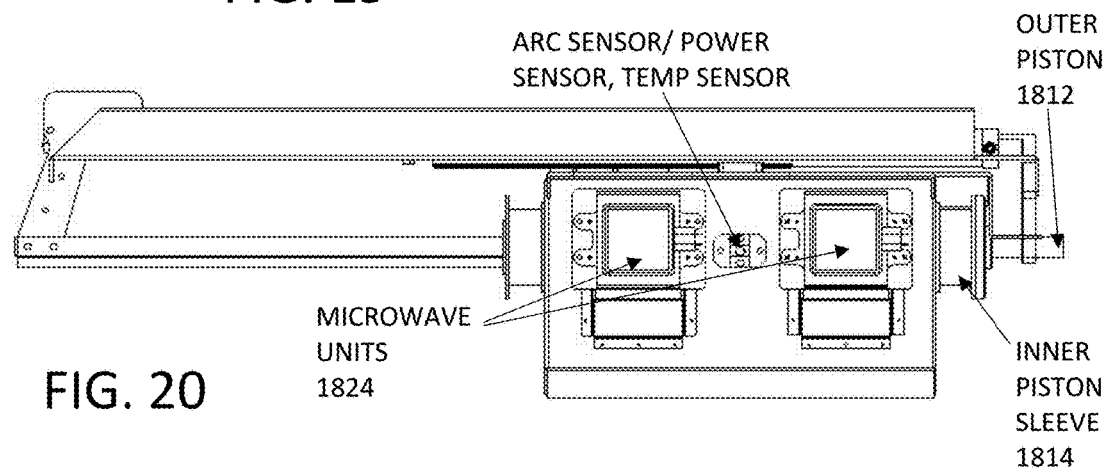
FIG. 20 is a schematic diagram showing the dryer system of FIG. 19 with the dryer unit housing and fans removed.

FIG. 18 shows the dryer system 112 in a closed configuration with the inner piston 1816 retracted such as after material has been introduced into the drying chamber or during drying of the material. FIG. 19 is a schematic diagram showing a top view of relevant components of the dryer system 112 of FIG. 18. FIG. 20 is a schematic diagram showing the dryer system 112 of FIG. 19 with the dryer unit housing 1802 and fans 1804, 1806 removed to show two microwave units 1824 (although embodiments can include any number of microwave units) housed in an upper portion of the dryer unit housing 1802 that is ventilated by the left and right fans 1804, 1806, where each microwave unit 1824 generally includes a high voltage transformer and associated magnetron tube and waveguide to direct microwave energy through the inner piston sleeve 1814 into the drying chamber.

The inner piston sleeve 1814 may be formed of any of a variety of materials that allow microwave energy to pass through to the material in the drying chamber and preferably do not react with the microwave energy, such as, for example, certain plastics, e.g., TEFLON™, certain ceramics, certain types of glass, etc. Additionally or alternatively, the dryer unit 1801 may be configured to allow microwave energy to reach the material in the drying chamber in other ways, e.g., a window or opening in the inner piston sleeve 1814.

Figure 21:
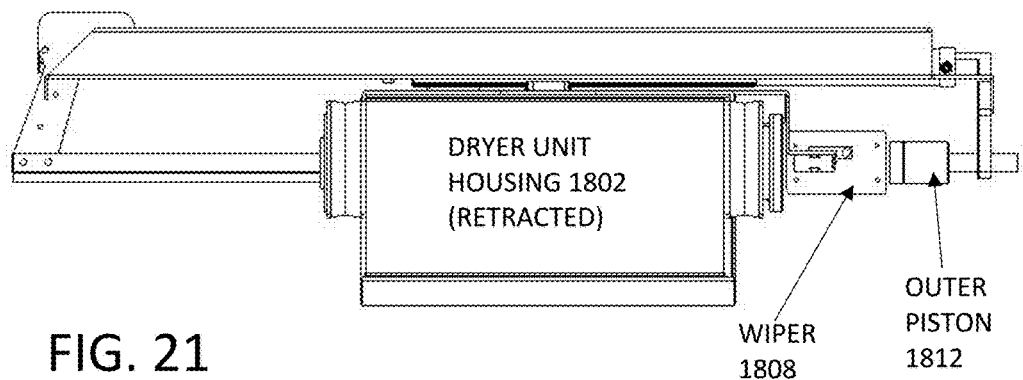
FIG. 21 is a schematic diagram showing the dryer system of FIG. 19 in an opened configuration with the inner piston still in a retracted position.

FIG. 21 is a schematic diagram showing the dryer system 112 of FIG. 19 in an opened configuration with the inner piston 1816 still in a retracted position such as in preparation for ejecting dried material from the drying chamber (which would be accomplished here by actuating the inner piston 1816 to move through the inner piston sleeve 1814 from left to right in FIG. 21 until the inner piston 1816 is fully deployed within and through the inner piston sleeve 1814).

Figure 22A:
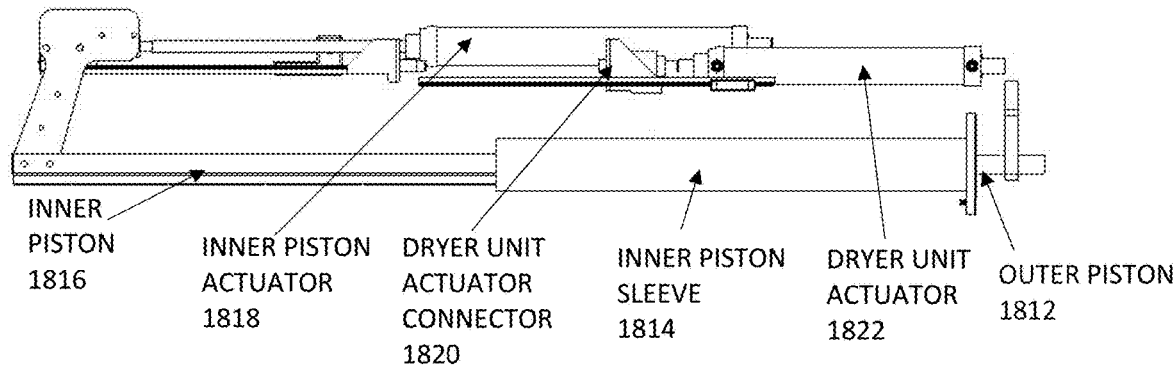
FIG. 22A is a schematic diagram showing the drying system of FIGS. 19 and 20 with the dryer unit housing and surrounding components removed.
Figure 22B:
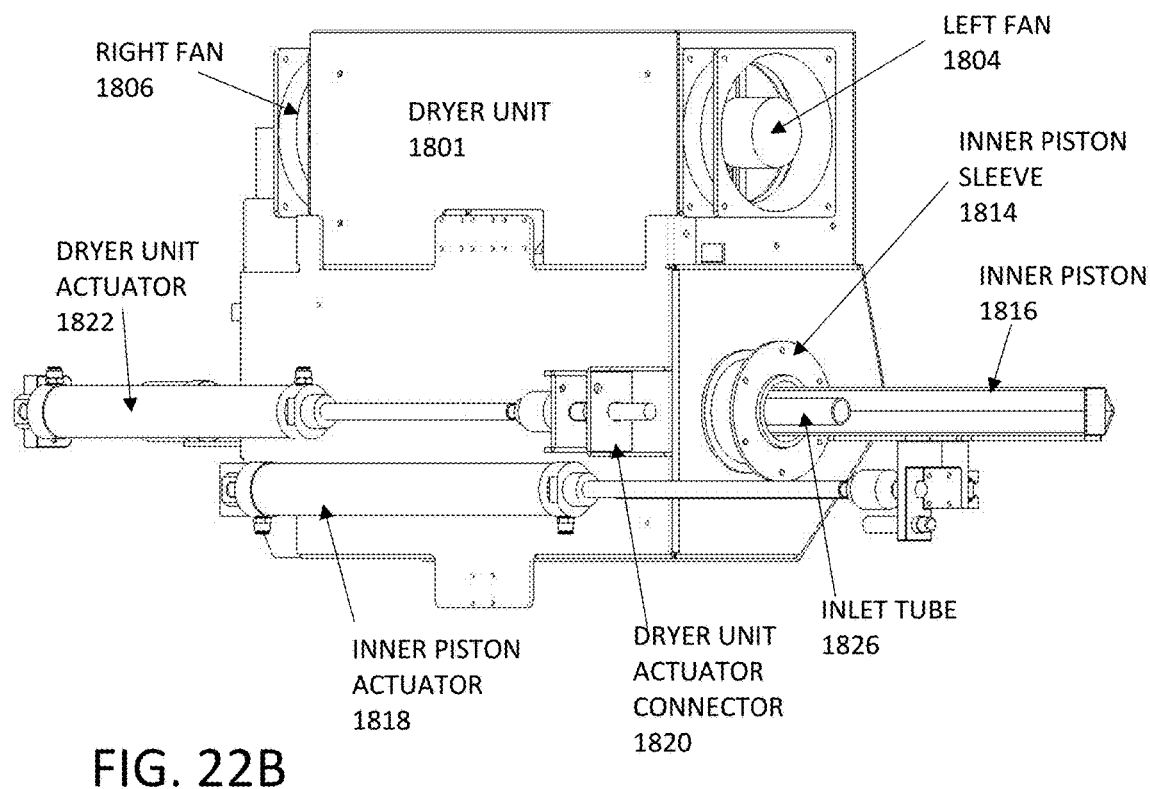
FIG. 22B is a schematic diagram showing a rear view of the dryer unit and related components of FIGS. 19 and 20.

FIG. 22A is a schematic diagram showing the drying system 112 of FIGS. 19 and 20 with the dryer unit housing 1802 and surrounding components removed in order to show the relationship between the inner piston 1816, the inner piston sleeve 1814, the outer piston 1812, and the actuators (including dryer unit actuator connector 1820 for connecting the dryer unit actuator 1822 to the dryer unit 1801), which, in this example, shows these components in a closed position such as might be seen after material is filled into the drying chamber and during drying of the material in the drying chamber. FIG. 22B is a schematic diagram showing a rear view of the dryer unit 1801 and related components of FIGS. 19 and 20 and further showing an inlet tube 1826 that couples with the inner piston 1816 and allows materials and air (or other additive, if desired) to be introduced into the drying chamber through the inner piston 1816 (e.g., the inlet tube 1820 may have two passages to separately carry material and air, e.g., a coaxial tube, or may include two separate tubes). The inlet tube(s) 1820 pass through a portion of the inner piston sleeve 1814 and move(s) along with movement of the inner piston 1816. One or more inlet tubes 1820 additionally can be configured to allow gasses and moisture to exit through the inner piston 1816 in addition to, or in lieu of, exiting through the outer piston 1812.

Embodiments generally include an exhaust temperature sensor and an antenna within the dryer unit 1801 such as for detecting when the product is approaching a critical temperature at which burning is about to occur, at which point microwave power can be automatically attenuated to avoid burning the product or damaging components.

Figure 23:
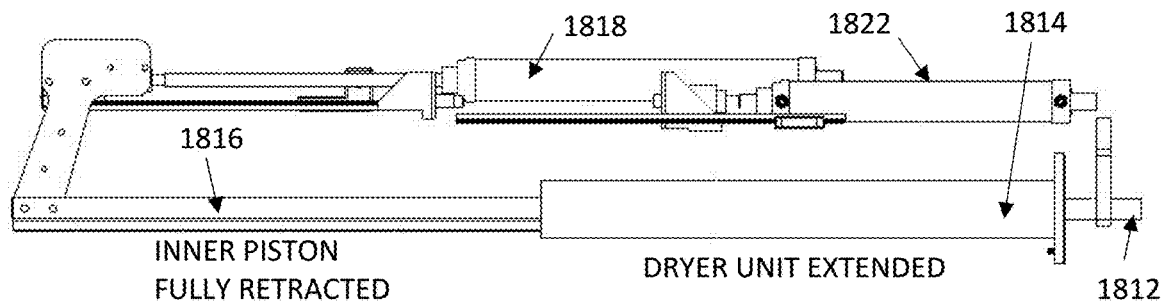
FIG. 23 is a schematic diagram showing the drying system in a fully closed configuration.

An exemplary drying sequence is now described with reference to FIGS. 23-26 with the dryer unit housing 1802 and surrounding components removed in order to show the relationship between the inner piston 1816, the inner piston sleeve 1814, the outer piston 1812, and the actuators 1818, 1822 as in FIG. 22A. FIG. 23 is a schematic diagram showing the drying system 112 in a fully closed configuration such as might be seen after material is filled into the drying chamber and during drying of the material in the drying chamber. Here, the dryer unit with inner piston sleeve 1814 is placed in the closed position (i.e., with the outer piston 1812 mated to the end of the inner piston sleeve 1814 so as to close off the drying chamber) and the inner piston 1816 is shown in the fully retracted position such that there would be a space extending between the inner piston 1816 and the outer piston 1812 within the inner piston sleeve 1814, e.g., containing material to be dried that was introduced into the drying chamber during a filling operation, which generally would be done as the inner piston 1816 is being retracted from the position shown in FIG. 26. In this position, with material contained in the drying chamber, the microwave units 1824 can be controlled to dry the material in the drying chamber. During drying, air or other additive can be introduced into the drying chamber through the inner piston 1816, and steam or other product can be exhausted through outer piston 1812 exhaust outlet.

Figure 24:
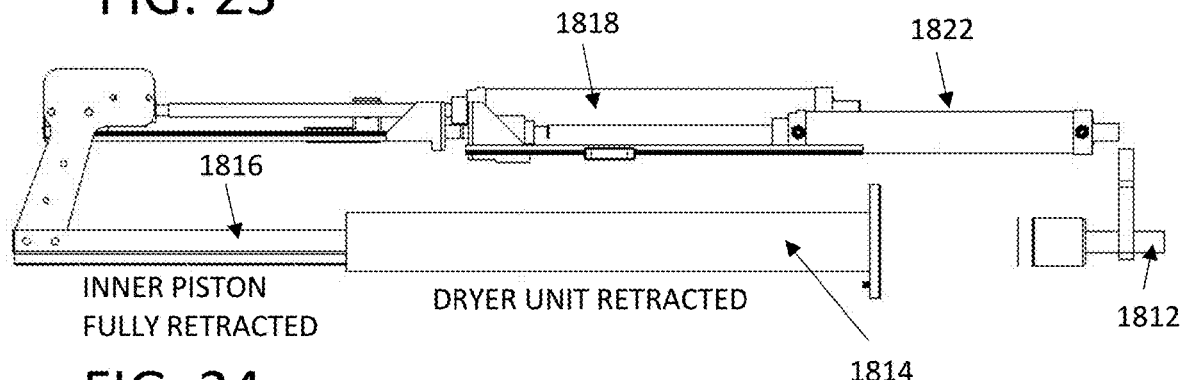
FIG. 24 is a schematic diagram showing the inner piston sleeve (and hence also the drying unit) moved from its position in FIG. 23 to a fully opened position.

FIG. 24 is a schematic diagram showing the inner piston sleeve 1814 (and hence also the drying unit 1801) moved from its position in FIG. 23 to a fully opened position such as might be seen in preparation for ejecting dried material from the drying chamber. From the position in FIG. 24, the inner piston 1816 can be extended through the inner piston sleeve 1814 via the inner piston actuator 1818 to eject material from the drying chamber.

Figure 25:
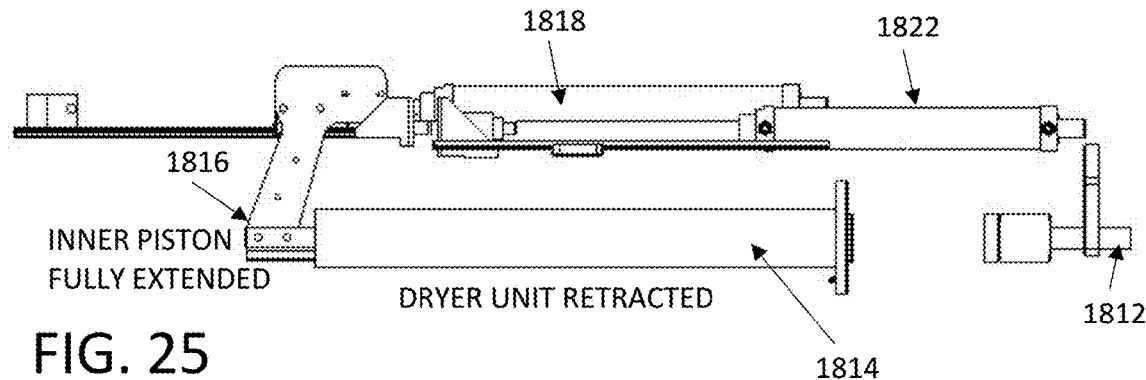
FIG. 25 is a schematic diagram showing the inner piston fully moved from its position in FIG. 24 to extend substantially all the way through the inner piston sleeve.

FIG. 25 is a schematic diagram showing the inner piston 1816 fully moved from its position in FIG. 24 to extend substantially all the way through the inner piston sleeve 1814 such as might be seen when the dried material is fully ejected from the drying chamber. Here, the wiper 1808 (not shown in these views) generally would be actuated to break off any dried material extending from the end of the inner piston sleeve 1814 and clean the surfaces of the two pistons 1812, 1816 so that they are ready for the next filling and drying cycle. From the position in FIG. 25, the inner piston sleeve 1814 (and hence also the drying unit 1801) would be moved back into the closed position to prepare for the next filling and drying cycle.

Figure 26:
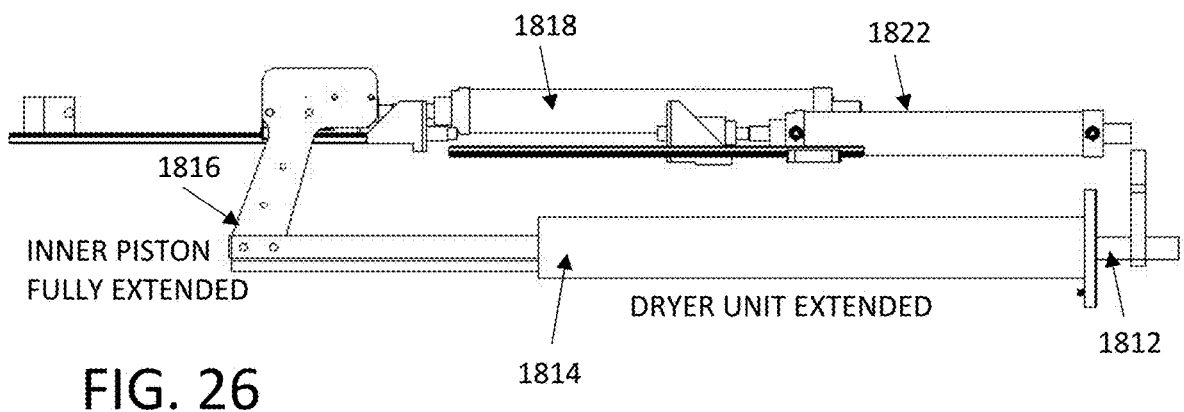
FIG. 26 is a schematic diagram showing the inner piston sleeve moved from its position in FIG. 25 to the fully closed position.

FIG. 26 is a schematic diagram showing the inner piston sleeve 1814 moved from its position in FIG. 25 to the fully closed position such as might be seen when the drying system 112 is prepared to receive additional material for drying. From the position in FIG. 26, the inner piston 1816 would be retracted while at the same time material is injected through the inner piston 1816 into the drying chamber as it grows in size until the inner piston 1816 reaches the fully retracted position as shown in FIG. 23, at which time drying could begin. As mentioned above, air or other additive can be added during the drying process, e.g., through the inner piston 1816.

Figure 27:
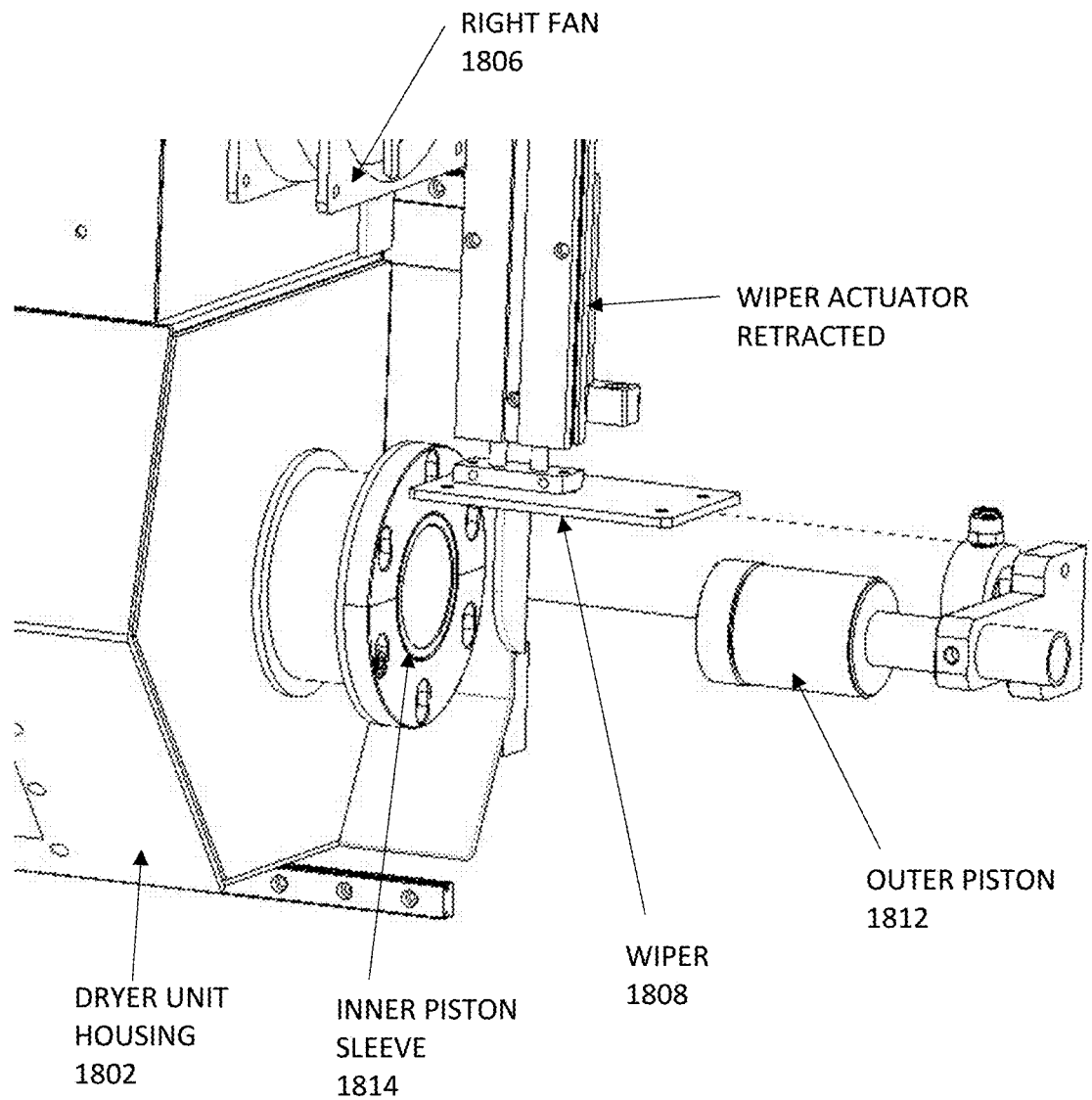
FIG. 27 is a schematic diagram showing details of the inner piston sleeve, outer piston, and wiper such as when the inner piston sleeve is in the position shown in FIGS. 24 and 25.
Figure 28:
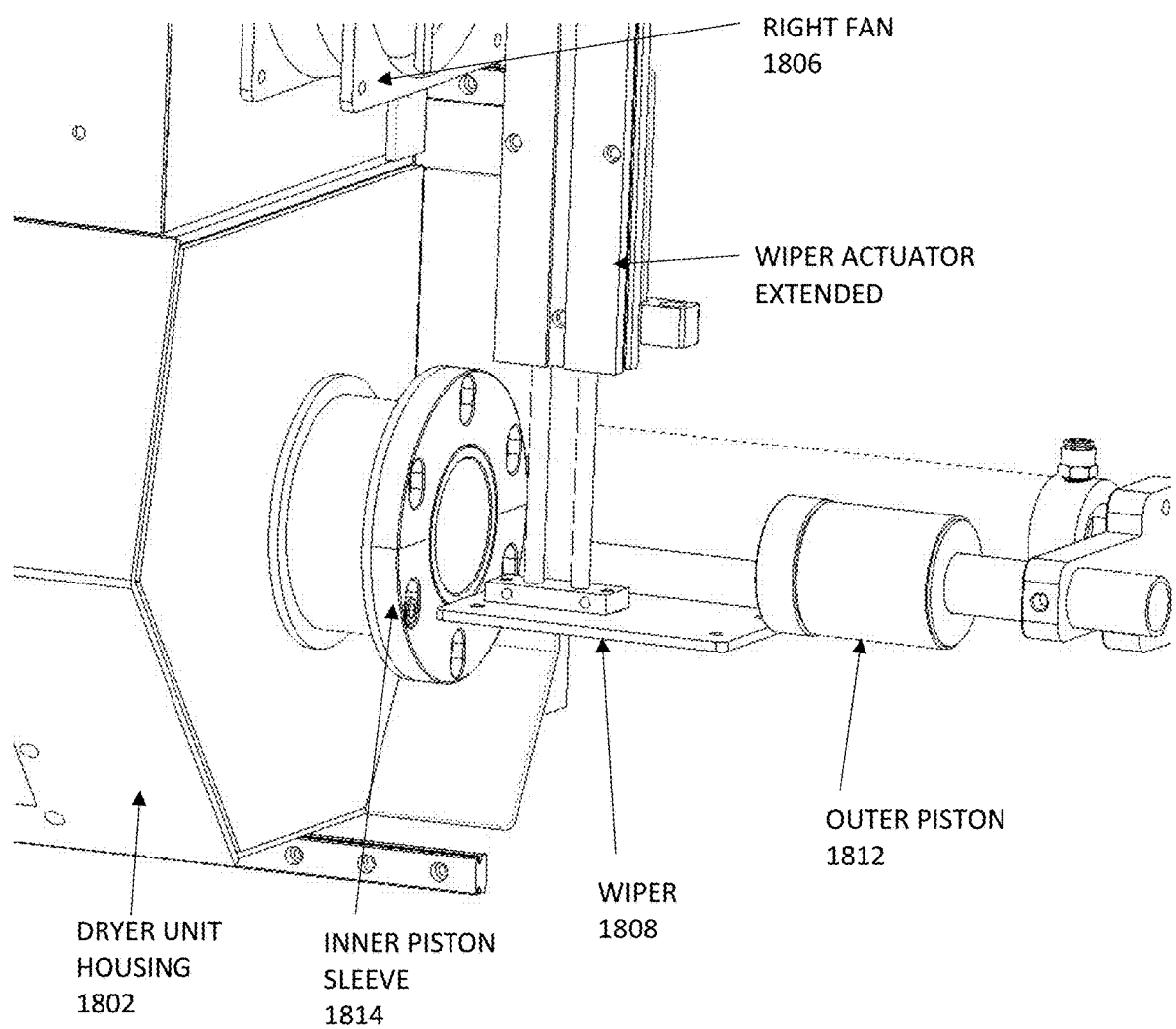
FIG. 28 is a schematic diagram showing the wiper in an actuated position such as for breaking off any dried material extending from the end of the inner piston sleeve and scraping any residual material from the surfaces of the two pistons.

FIG. 27 is a schematic diagram showing details of the inner piston sleeve 1814, outer piston 1812, and wiper 1808 such as when the inner piston sleeve 1814 is in the position shown in FIGS. 24 and 25. FIG. 28 is a schematic diagram showing the wiper 1808 in an actuated position such as for breaking off any dried material extending from the end of the inner piston sleeve 1814 and scraping any residual material from the surfaces of the two pistons 1812, 1816.

It should be noted that the dryer system 112 generally includes various process to control sensors such as, for example, an exhaust temperature sensor (an infrared or other temperature sensor), a microwave power sensor, and an arc sensor (e.g., a photo-based sensor that can detect arcing within the drying chamber). Parameters such as microwave power and drying time can be controlled at least in part based on signals from the temperature sensor. Generally speaking, the material is dried until the exhaust reaches a predetermined temperature, which may be indicative of the final moisture content of the material. A correlation can exist between different types of organic waste materials and process temperature, which can be readily determined by testing. For example, in one example, a temperature of at least 340.degree. F. indicates a moisture content of no more than 10%. The type of organic waste may be somewhat consistent at a particular location (e.g., certain types and mixtures of foods), and thus once a correlation between temperature and moisture content has been determined for that location, the temperature may serve as a suitable determination of the moisture content. For most applications, the moisture content of the dried material as it is discharged from the drying chamber is in the range of 10 to 13%. It will be appreciated that the moisture content can vary, for example, from a low of 1%, 2%, 3%, 4%, 5%, 6%, 7%, 8%, 9%, or 10% to a high of 13%, 14%, 15%, 20% or 25%. The temperature sensor is in communication with the control system 117, which can control each of the microwave units 1824 individually to provide a desired amount of heating. After the material is dried, it generally is allowed to cool before being ejected by the inner piston 1816. The inner piston 1816 generally includes a wiper or scraper (e.g., O-ring type scrapers) to clean the drying chamber (i.e., the inner surface of the inner piston sleeve 1814) between drying cycles. A drying process can be halted, for example, if excessive temperature is detected, if excessive microwave power is detected, or if an arc is detected (which could be indicative of metals contained in the material being dried).

Thus, the inner piston 1816 allows a complete wiping of all surfaces within the drying chamber after every cycle, and this, in combination with the external wiper 1808 that cleans the faces of the inner and outer pistons 1812, 1816 ensures that no product remains in the drying chamber after each cycle. Residual product could cause damage to the system such as by burnt or over-heated product.

The configuration of the inner piston 1816, inner piston sleeve 1814, outer piston 1812, and other components are generally configured with integral sealing mechanisms to guard against leaking microwave energy (e.g., a microwave choke).

It should be noted that while the described embodiment of the drying system 112 includes a drying unit 1801 that is movable, alternative embodiments can include a fixed drying unit 1801 in which material is passed into and out of the drying unit 1801 in other ways, e.g., using a conveyor system. Such alternative embodiments also may use two pistons, with both pistons being movable in lieu of moving the drying unit.

It should be noted that air heated by operation of the microwave units 1824 can be recycled for use within the system, e.g., to provide heat to the liquification system 102, the boiler system 108, or within the drying system 112 itself.

External Receptacle

Figure 45:
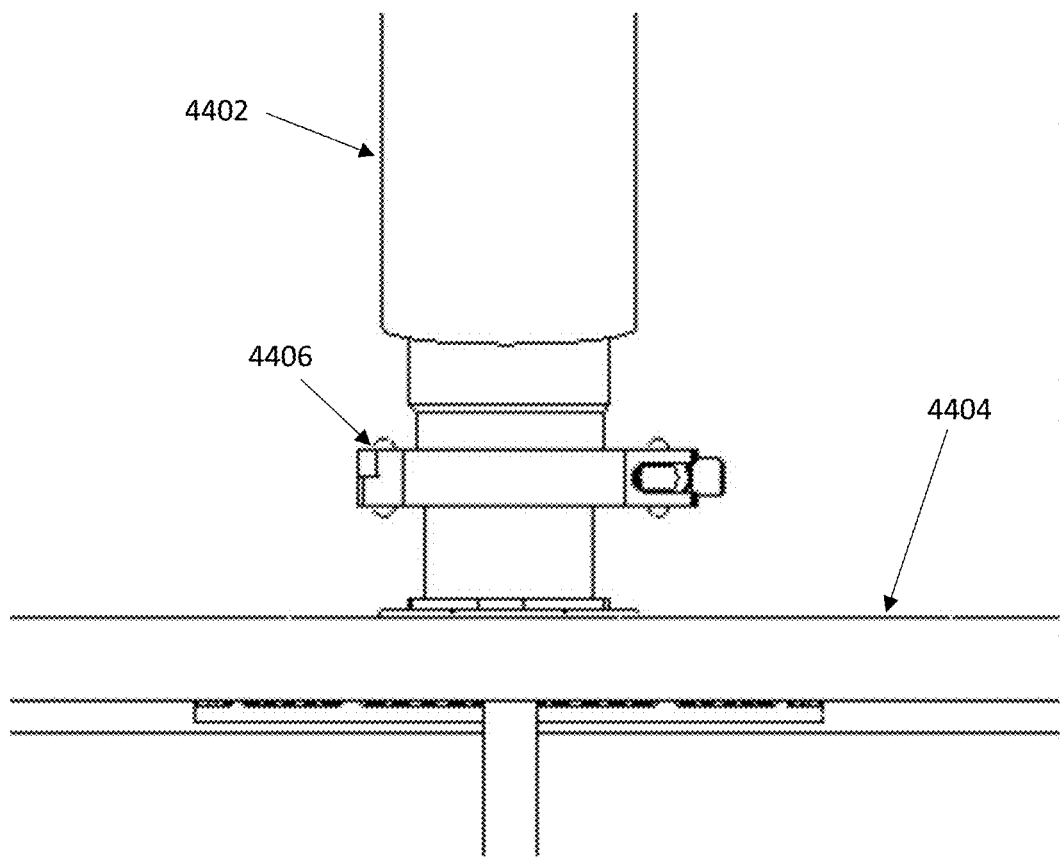
FIG. 45 is a schematic diagram showing the quick-connect mechanism of FIG. 44.
Figure 46:
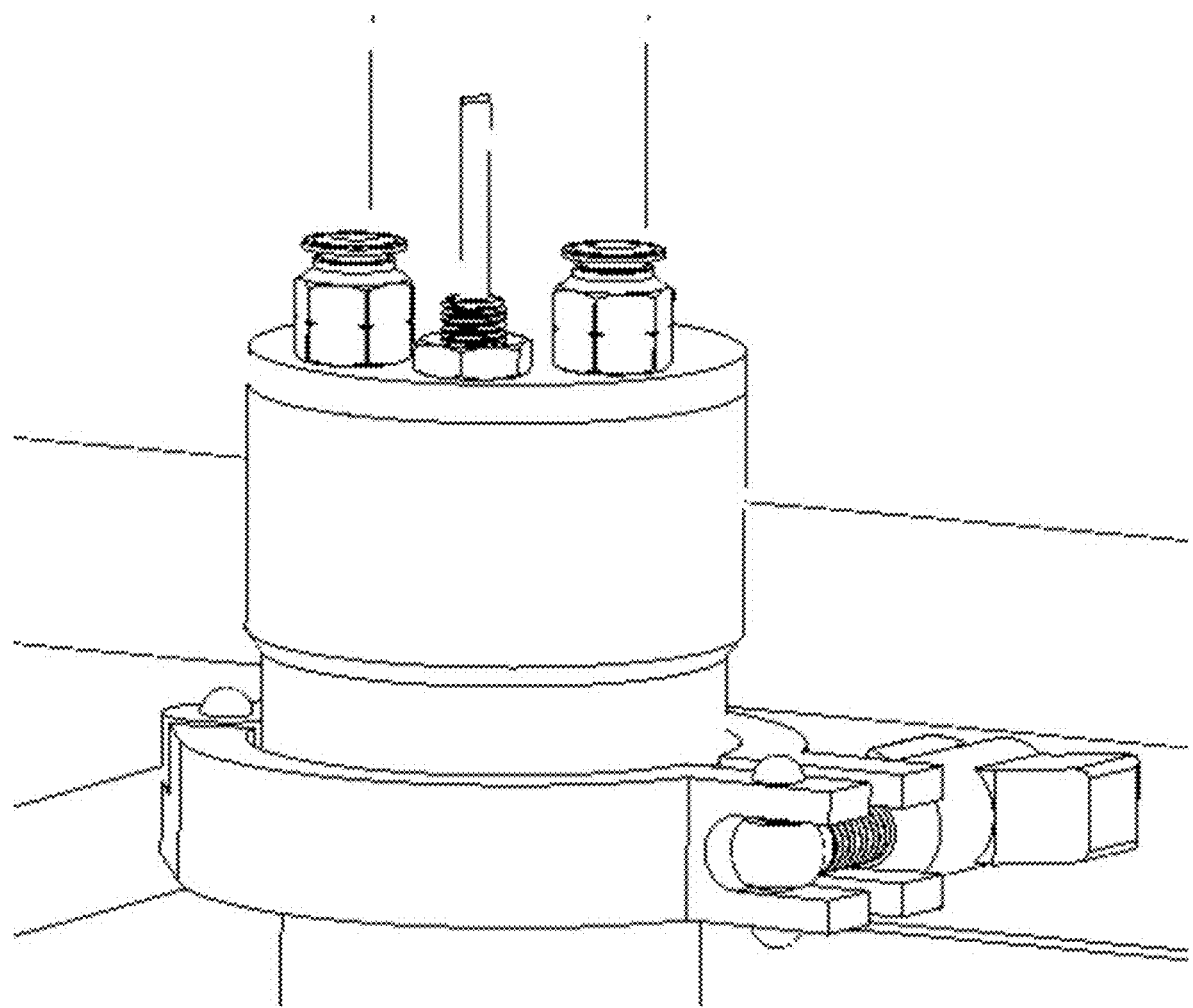
FIG. 46 is a detailed view of the quick-connect mechanism of FIG. 45.

FIG. 44 schematically shows the alternative liquification system 102 coupled to an external receptacle 4404 to which final product is pumped via a conduit 4402, e.g., using pump 1202 shown in FIG. 38. In this example, a quick-connect mechanism 4406 is used to allow for quickly attaching conduit 4402 to receptacle 4404 and for quickly disconnecting conduit 4402 from receptacle 4404. FIG. 45 is a schematic diagram showing the quick-connect mechanism of FIG. 44. FIG. 46 is a detailed view of the quick-connect mechanism of FIG. 45.

Among other things, the ability to pump or otherwise convey residual material to a remote receptacle allows the receptacle to be placed in a remote location relative to the system 100 (e.g., at a loading dock or outside) and the system 100 will pump/convey residual to the collection receptacle. The quick-connect mechanism allows the tank to be connected to a conveyance system (e.g., a pump) so that the user can quickly and safely change a single connection with the system 100. Embodiments can include an integrated sensor package that includes sensing to make sure the connection is made correctly. Embodiments can include unique identification of residual containers so that the contents of a specific collection receptacle can be tracked back to the point of origin as well as contents loaded into the machine while this residual container was installed. The unique identification can consist of scannable codes (e.g., barcodes, QR codes, etc.), RFID chips, or other unique identifiers. This information can be used to dictate how the material is processed such as to make it grounds ready fertilizer, as well as provide traceability for contamination or process issues. Embodiments can include optional integrated heating of collection receptacles such as from electric heat, solar, or waste heat from the system 100 and/or other on-site processes. Receptacles can be preloaded with treatments that help process the product so that it has more desirable chemical composition such as for use as a fertilizer.

Control System and User Interface

The control system generally tracks various parameters including, for example, the identity of users who load organic materials into the system (e.g., by users entering a PIN or through other mechanism such as an RFID reader, fingerprint reader, facial recognition, etc.), the types and amounts of materials introduced into the system (e.g., keyed in by users or identified using a camera). The system may provide various forms of security such as to prevent unauthorized users from introducing materials into the system, to prevent unauthorized users from operating system, to prevent improper materials from being loaded into the system (e.g., using image or video processing to identify materials and shutting down the system upon detecting improper or harmful materials), etc. The system may include a hopper door lock controllable by the control system so that, for example, the door can be unlocked only upon detecting an authorized user and/or proper waste materials or can be locked to prevent overloading of the system.

The control system may select process parameters based on various factors such as, for example, the types and amounts of waste materials introduced into the system, the amount of moisture desired for a given output product, etc.

Remote access may be provided to the control system, e.g., to allow a remote operator or administrator to change recipes, adjust operating parameters (e.g., when to enter power saving mode), add new users, monitor power usage and device status, perform software upgrades, etc.

The control system and/or an external system (e.g., implemented using one of more servers and/or a cloud-based service) can perform and provide a wide range of operational and analytical tools such as, for example, tracking users, tracking organic waste content, tracking machine operation (e.g., based on sensors that can detect if something is clogging the system), identifying sources of waste, identifying mixtures of processed materials such as for particular uses or fertilizers (identifying dried waste products from a single machine or across multiple machines, including across multiple customers, that can be mixed to produce a particular fertilizer recipe), producing environmental impact data (e.g., analytics to show amount of waste processed, carbon dioxide reduction, waste volume/weight reduction, etc., on a per device basis and across multiple devices), recommending different biological mixes or recipes (e.g., instruct a customer to add more of a particular type of waste and/or additive in order to improve the final product), etc.

Thus, for example, a central control system (e.g., implemented using one or more servers and/or a cloud-based service) can monitor and control individual systems as well as groups of systems that can be at the same or different locations and can be operated by the same or different operators and can generate a wide range of control and analytical information.

Miscellaneous

The inventors contemplate that each of the described components can be used with or without the other described components. Thus, for example, the described liquification system 102 can be used alone or with the described boiler system 108 and/or the described dryer system 112 or with other types of boilers, dryers, or other systems (e.g., to liquify materials for use in other types of processing systems). Similarly, the described boiler system 108 can be used alone or with the described liquification system 102 and/or the described dryer system 112 or with other types of liquification systems, dryers, or other systems (e.g., to dehydrate or condense materials produced in other types of processing systems). Similarly, the described dryer system 112 can be used alone or with the described liquification system 102 and/or boiler system 108 or with other types of liquification systems, boilers, or other systems (e.g., to dry material produced in other types of processing systems).

The inventors contemplate that certain types of resources often available at customer sites may be leveraged in various embodiments such as, for example, heating or cooling resources (e.g., recycled from a customer HVAC system) or water resources (e.g., clean water, recycled or gray water, collected rainwater, etc.). For example, waste heat from a customer HVAC system could be pumped into the system such as to provide heat for the liquification system 102, the boiler system 108, or the drying system 112, or could be used in other ways, e.g., for external drying of waste materials such as by exposing waste materials to such waste heat.

While the exemplary embodiments described above include a hopper door used for manual loading of organic waste into the liquification system 102, alternative embodiments (particularly larger systems) additionally or alternatively may include other mechanisms for loading of organic waste into the liquification system 102, such as, for example, a power lifter (e.g., powered electrically, hydraulically, pneumatically, etc.) or conveyor system to help with loading of organic waste into the liquification system 102.

In addition to, or in lieu of a drying system such as the microwave drying system described above, various alternative embodiments could perform drying separately from the system. For example, it should be noted that the condensed food waste product 109 generally will be hot when removed from the boiler system 108 and therefore the condensed food waste product 109 could be collected and dried, e.g., by leaving it in the sun, optionally in a container with a one-way vent system to allow steam to escape but no water to enter.

Wherever heat is used in the system (e.g., the boiler system 108 and optionally the liquification system 102 and the drying system 112), any of various types of heat sources may be used, e.g., electric, natural gas, propane, solar-generated heat, etc. Solar panels may be included in some embodiments to provide electricity for powering various components of the system.

It should be noted that any products recovered from the system can be tested, treated, and/or enriched, and data relating to such products can be used to make process changes within the system. For example, additives or treatments can be added to a residual container such as to stabilize the recovered product or improve its efficacy for a particular purpose such as for use as a fertilizer. It also is possible to separate out components of the waste products, e.g., by value.

It should be noted that headings are used above for convenience and are not to be construed as limiting the present invention in any way.

Various embodiments of the control system (controller) and user interface may be implemented at least in part in any conventional computer programming language. For example, some embodiments may be implemented in a procedural programming language (e.g., "C"), or in an object-oriented programming language (e.g., "C++"). Other embodiments may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the control system) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. A liquification system for an organic waste management system, wherein the liquification system that is vertically oriented with bottom grinder.

P2. A system according to claim P1, wherein the liquification is vertically oriented but offset from a vertical axis.

P3. A system according to claim P1, comprising a shaft having a bottom impeller, a motor, and a fixed grinding plate in which the bottom impeller forces organic waste against the fixed grinding plate to grind the organic waste.

P4. A system according to claim P3, wherein the fixed bottom plate is oriented at an angle relative to the vertical axis and includes a strainer leading to an outlet on a bottom of the grinding plate.

P5. A system according to claim P3, wherein the shaft further includes a screw auger to assist with movement of the organic waste within the hopper.

P6. A system according to claim P3, wherein the motor is outside of a hopper containing the shaft with bottom impeller in order to avoid contamination of the motor and related bearings and seals.

P7. A drying system for an organic waste management system comprising a drying unit that is movable relative to two pistons.

P8. A system according to claim P7, wherein the drying unit is a microwave drying unit.

P9. A system according to claim P7, wherein the drying unit includes an inner piston sleeve that forms part of a drying chamber and wherein the system further comprises an inner piston that is movable within the inner piston sleeve and an outer piston that is stationary, wherein the drying unit is movable between a closed position in which the inner piston sleeve mates with the outer piston and an opened position in which the drying unit is moved away from the outer piston to allow the inner piston to be extended to eject dried material from the drying chamber.

P10. A system according to claim P9, wherein the outer piston includes an exhaust outlet to allow for steam or other exhaust products to be removed from the drying chamber.

P11. A system according to claim P10, wherein the inner piston includes at least one opening to allow for injection of material into the drying chamber through the inner piston and optionally to allow for injecting air or other additive into the drying chamber during a drying process.

P12. A system comprising a liquification system according to any one of claims P1-P6; and a boiler system for dehydrating or condensing liquified materials produced by the liquification system.

P13. A system according to claim P12, further comprising:
a drying system according to any one of claims P7-P11.

P14. A system according to any one of claims P12-P13, further comprising:
at least one pre-boiler processor and/or at least one post-boiler processor.

P15. A system according to any one of claims P1-P14, further comprising a process controller that controls at least one of liquification, dehydration, or drying based on the types of organic wastes being processed by the system P16. A system according to claim P15, further comprising a user interface through which a user can identify the types of organic wastes added to the system.

P17. A system according to any one of claims P15-P16, further comprising at least one sensor that allows for sending the types of organic wastes added to the system.

P18. A system according to claim P17, wherein the at least one sensor includes a camera and wherein the types of organic wastes are identified using image processing.

P19. Modularity of the system, ability to be connected with multiple units in remote locations, using a pump to move material between process components.

P20. Tracking of contents loaded into the machine via manual input, smart collection containers, department, or individual loading the machine, camera recognition.

P21. Tank with vertical orientation with a central auger for turning material over within the tank for improved mixing capabilities. In one direction the auger drives material to the bottom of the tank where it can be ground and pumped to the next process step, in the other direction the auger lifts material to the middle of the tank so that food waste on the top can be covered in material rich in the tanks curated biology.

P22. The tank's cone shaped geometry at the tanks lower section limit's force required to mix contents and reduces jamming tendencies.

P23. Mixing wiper and tank bottom interaction with that uses force to wipe across tank outlet holes effectively clearing clogs and forcing material through the tank bottom where it can be pumped away. The shape of the holes and reliefs used in the tank provide the conditions for maximum throughput of desired particle size while avoiding clogging.

P24. Sensors on the tank are specifically designed to aid in process efficacy which include weight, jam sensing, temperature. Through the sensor package the tank can change its temperature using a heat blanket, mixing speed, mixing direction using a smart motor controller to achieve the fastest breakdown rates which are determined by tank weight over time.

P25. Tank has flexibility to be connected to more process enhancements such as exhaust for odor reduction, separators for moisture or oil reduction, automatic dosing of biological elements.

P26. Tank has replaceable grinding elements on cone section as well as tank bottom that allow it to grind through bones, fibrous materials, fruit peels and skins, compostable cutlery, compostable packaging, pits, and other items traditionally difficult to break down within the industry. This has the effect of creating more surface area for the biology to be effective on as well as break particles into a component size acceptable for fertilizer.

P27. Heated tank walls are self-cleaning via an internal wiper so that product can be evenly heated to kill pathogens, reduce moisture content so that material can be safely stored.

P28. A sensor package consisting of weight and temperature controls the process so that we can monitor weight reductions achieved by the process as well as throughput as it relates to residual.

P29. The piston inside of a microwavable container is novel in that it allows a complete wiping of all surfaces withing the microwave after every cycle. In combination with an external wiper that cleans the faces of the pistons on either end of the container (tube) no product remains in the container after a cycle which prevents damage to the system caused by over-heated product.

P30. A piston attached to a tube that can carry product to be dried, process air for carrying away moisture, an exhaust port for carrying away moisture and other airborne byproducts, and an integrated seal to guard against leaking microwave energy.

P31. Sensor packages including an exhaust temperature sensor and antenna within the microwave can detect when the product is reaching a critical temperature at which point burning is about to happen. By attenuating microwave power when this condition is sensed the system can avoid burning product or damaging components.

P32. Ability to be placed in a remote location like a loading dock or outside and the machine will pump/convey residual to the collection receptacle P33. Method of quick connection so that the tank can be connected to conveyance system (e.g., pump), so that the user can safely change a single connection with the machine. Integrated sensor package that includes sensing to make sure the connection is correctly made P34. Unique identification of residual containers so that the contents of the specific collection receptacle can be tracked back to the point of origin as well as contents loaded into the machine while this residual container was installed. The unique identification can consist of barcodes, RFID chips or other unique identifiers. This information can be used to dictate how the material is processed to make it grounds ready fertilizer, as well as provide traceability for contamination or process issues.

P35. Optional integrated heating of collection receptacles from electric heat, solar, or waste heat from this, or other on-site processes.

P36. Preloading containers with treatments that help process the product so that it has more desirable chemical composition for use as a fertilizer.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A liquification system for an organic waste management system, the liquification system comprising:
   a hopper that receives organic waste through an inlet at a top end of the hopper, the hopper being oriented vertically such that organic waste added to the hopper is biased by gravity toward a bottom end of the hopper;
   a fixed grinding plate disposed at the bottom end of the hopper and including grinding elements for grinding and liquefying organic waste;
   an agitator that is disposed within the hopper and is movable relative to the grinding plate in a first rotational direction that moves organic waste downward toward and against the grinding plate and in a second rotational direction that moves organic waste upward toward a top end of the hopper;
   a motor configured to selectively move the agitator in the first and second rotational directions; and
   an outlet through the bottom end of the hopper through which liquified organic waste drains from the hopper.

2. The system according to claim 1, wherein the hopper is vertically oriented but offset from a vertical axis such that the grinding plate is offset from a horizontal axis and the grinding plate includes drainage holes on a lower side of the grinding plate to assist with drainage of the liquified organic waste.

3. The system according to claim 2, wherein the drainage holes are sized to prevent drainage of non-liquified organic waste.

4. The system according to claim 1, wherein the agitator comprises a shaft having a bottom impeller configured to force organic waste against the grinding plate to grind the organic waste when the agitator is moved in the first rotational direction.

5. The system according to claim 4, wherein the agitator further includes a screw auger to assist with movement of the organic waste within the hopper.

6. The system according to claim 1, wherein the motor is outside of the hopper in order to avoid contamination of the motor and associated bearings and seals from organic waste within the hopper.

7. The system according to claim 1, wherein the bottom end of the hopper comprises a tapered portion narrowing toward the grinding plate.

8. The system according to claim 7, further comprising at least one grinding element disposed on the tapered portion, wherein movements of the agitator drive organic waste against such at least one grinding element.

9. The system according to claim 1, further comprising:
a weight sensor for sensing weight of the contents of the hopper.

10. The system according to claim 1, further comprising:
an electronically-lockable hopper door for selectively blocking the inlet at the top end of the hopper.

11. An organic waste management system comprising:
a controller; and
a liquification system comprising:
  a hopper that receives organic waste through an inlet at a top end of the hopper, the hopper being oriented vertically such that organic waste added to the hopper is biased by gravity toward a bottom end of the hopper;
  a fixed grinding plate disposed at the bottom end of the hopper and including grinding elements for grinding and liquefying organic waste;
  an agitator that is disposed within the hopper and is movable relative to the grinding plate in a first rotational direction that moves organic waste downward toward and against the grinding plate and in a second rotational direction that moves organic waste upward toward a top end of the hopper;
  a motor configured to selectively move the agitator in the first and second rotational directions under control of the controller; and
  an outlet through the bottom end of the hopper through which liquified organic waste drains from the hopper.

12. The system according to claim 11, wherein the hopper is vertically oriented but offset from a vertical axis such that the grinding plate is offset from a horizontal axis and the grinding plate includes drainage holes on a lower side of the grinding plate to assist with drainage of the liquified organic waste.

13. The system according to claim 12, wherein the drainage holes are sized to prevent drainage of non-liquified organic waste.

14. The system according to claim 11, wherein the agitator comprises a shaft having a bottom impeller configured to force organic waste against the grinding plate to grind the organic waste when the agitator is moved in the first rotational direction.

15. The system according to claim 14, wherein the agitator further includes a screw auger to assist with movement of the organic waste within the hopper.

16. The system according to claim 11, wherein the motor is outside of the hopper in order to avoid contamination of the motor and associated bearings and seals from organic waste within the hopper.

17. The system according to claim 11, wherein the bottom end of the hopper comprises a tapered portion narrowing toward the grinding plate.

18. The system according to claim 17, further comprising at least one grinding element disposed on the tapered portion, wherein movements of the agitator drive organic waste against such at least one grinding element.

19. The system according to claim 11, further comprising:
a weight sensor in communication with the controller for sensing weight of the contents of the hopper.

20. The system according to claim 11, further comprising:
a hopper door that is electrically-lockable under control of the controller for selectively blocking the inlet at the top end of the hopper.

* * * * *